(12) United States Patent
Hariharan et al.

(10) Patent No.: US 9,479,308 B2
(45) Date of Patent: Oct. 25, 2016

(54) SIGNALING OF RESOURCE ASSIGNMENTS IN CROSS-CARRIER SCHEDULING SCENARIOS

(75) Inventors: Priya Hariharan, Dallas, TX (US); Christian Wengerter, Kleinheubach (DE); Akihiko Nishio, Kanagawa (JP); Hidetoshi Suzuki, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 583 days.

(21) Appl. No.: 13/519,992

(22) PCT Filed: Dec. 22, 2010

(86) PCT No.: PCT/EP2010/007894
§ 371 (c)(1),
(2), (4) Date: Sep. 27, 2012

(87) PCT Pub. No.: WO2011/082814
PCT Pub. Date: Jul. 14, 2011

(65) Prior Publication Data
US 2013/0064190 A1   Mar. 14, 2013

(30) Foreign Application Priority Data
Jan. 5, 2010  (EP) .................... 10000039

(51) Int. Cl.
*H04L 5/00*  (2006.01)
*H04L 27/26*  (2006.01)
(Continued)

(52) U.S. Cl.
CPC .......... *H04L 5/0053* (2013.01); *H04L 1/0029* (2013.01); *H04L 1/0031* (2013.01);
(Continued)

(58) Field of Classification Search
CPC .......... H04L 5/00; H04L 27/00; H04L 1/00; H04W 72/00
USPC .......................................... 370/329
See application file for complete search history.

(56) References Cited

U.S. PATENT DOCUMENTS

2004/0165683 A1* 8/2004 Gupta .................. H04L 25/0236
375/340
2010/0142455 A1* 6/2010 Imamura .............. H04W 52/146
370/329

(Continued)

OTHER PUBLICATIONS

3GPP TSG RAN WG! Meeting #58 bis, NTT DOCOMO, Oct. 12-16, 2009, R1-094237.*

(Continued)

*Primary Examiner* — Andrew Lai
*Assistant Examiner* — Sumitra Ganguly
(74) *Attorney, Agent, or Firm* — Pearne & Gordon LLP

(57) ABSTRACT

This invention relates to signaling of resource assignments in cross-carrier scheduling scenarios. In order to enable cross-carrier scheduling in a mobile communication system using carrier aggregation while avoiding erroneous detection of assigned physical resources that could lead to HARQ soft buffer corruption/degradation of the system throughput, the invention suggests a scheme for explicitly indicating within downlink control information (DCI) including a resource assignment for the downlink (or uplink) the number of OFDM symbol(s) used for control signaling within a sub-frame on a component carrier on which resources are assigned by the DCI. In one exemplary implementation the number of OFDM symbol(s) used for control signaling is the PCFICH values signaled in a 3GPP LTE-A network. The indication of the OFDM symbol(s) within the sub-frame on the assigned component carrier may for example be jointly encoded with other control signaling information, e.g. with the carrier indication of the carrier indicator field.

20 Claims, 10 Drawing Sheets

(51) Int. Cl.
*H04W 72/04* (2009.01)
*H04L 1/00* (2006.01)
*H04L 1/06* (2006.01)
*H04L 1/18* (2006.01)

(52) U.S. Cl.
CPC ............... *H04L1/0072* (2013.01); *H04L 1/06* (2013.01); *H04L 27/2602* (2013.01); *H04W 72/042* (2013.01); *H04L 1/1812* (2013.01); *H04W 72/0446* (2013.01)

(56) References Cited

U.S. PATENT DOCUMENTS

| | | | |
|---|---|---|---|
| 2010/0150092 A1* | 6/2010 | Aydin .................... | H04L 5/0007 370/329 |
| 2010/0182968 A1* | 7/2010 | Ojala .................... | H04W 52/54 370/329 |
| 2011/0205978 A1* | 8/2011 | Nory .................... | H04L 5/0007 370/329 |

OTHER PUBLICATIONS

3GPP RAN WG1 #59, Texas Instruments, Nov. 9-13, 2009, R1-094761.*
3GPP TSG RAN, WG1, #61, Panasonic, May 10-14, 2010, R1-102851.*
3GPP TS 36.211 v9.1.0 Mar. 2010, E-UTRA: Physical Channels and Modulation (Release 9).*
European Search Report for Application No. 10000039.7-1525 dated Jun. 8, 2010.
International Search Report for PCT/EP2010/007894 dated Apr. 4, 2011.
NTT DOCOMO: Views on Solution to PCFICH Detection Error, 3GPP Draft; R1-094237 PCFICH, 3rd Generation Partnership Project (3GPP), Mobile Competence Centre; 650, Route Des Lucioles, F-06921 Sophia-Antipolis Cedex; France, Oct. 12, 2009.
ZTE: PCFICH detection error handling, 3GPP Draft; R1-094737 PCFICH Detection Error Handling, 3rd Generation Partnership Project (3GPP), Mobile Competence Centre; 650, Route Des Lucioles, F-06921 Sophia-Antipolis Cedex; France, Nov. 9, 2009.
Texas Instruments PDCCH Carrier Indication Field for Cross-Carrier Scheduling, 3GPP Draft; R1-094761 3rd Generation Partnership Project (3GPP), Mobile Competence Centre; 650, Route Des Lucioles, F-06921 Sophia-Antipolis Cedex; France, Nov. 9, 2009.
Panasonic PCFICH in cross carrier operation 3GPP Draft; R1-102851 3rd Generation Partnership Project (3GPP), Mobile Competence Centre; 650, Route Des Lucioles, F-06921 Sophia-Antipolis Cedex; France, May 4, 2010.

* cited by examiner

SIGNALING OF RESOURCE ASSIGNMENTS IN CROSS-CARRIER SCHEDULING SCENARIOS

FIELD OF THE INVENTION

One aspect of this invention relates to a scheme for explicitly indicating within downlink control information (DCI) including a resource assignment for the downlink (or uplink) the number of OFDM symbol(s) used for control signaling within a sub-frame on a component carrier on which resources are assigned by the downlink control information. In one exemplary implementation the number of OFDM symbol(s) used for control signaling is the PCFICH values signaled in a 3GPP LTE-A network. The indication of the OFDM symbol(s) within the sub-frame on the assigned component carrier may for example be jointly encoded with other control signaling information, e.g. with the carrier indication of the carrier indicator field. Furthermore, the invention also relates to an implementation of these methods in hardware and software.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is to be finalized as Release 8 (LTE). The LTE system represents efficient packet-based radio access and radio access networks that provide full IP-based functionalities with low latency and low cost. The detailed system requirements are given in. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-Carrier Frequency Division Multiple Access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in LTE (Release 8).

LTE Architecture

The overall architecture is shown in FIG. 1 and a more detailed representation of the E-UTRAN architecture is given in FIG. 2. The E-UTRAN consists of eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE (Release 8) is subdivided in the time-frequency domain in so-called sub-frames. In 3GPP LTE (Release 8) each sub-frame is divided into two downlink slots, wherein the first downlink slot comprises the control channel region (PDCCH region) within the first OFDM symbols. Each sub-frame consists of a give number of OFDM symbols in the time domain (12 or 14 OFDM symbols in 3GPP LTE (Release 8)), wherein each of OFDM symbol spans over the entire bandwidth of the component carrier. The OFDM symbols are thus each consists of a number of modulation symbols transmitted on respective $N_{RB}^{DL} \times N_{sc}^{RB}$ subcarriers as also shown in FIG. 4.

Assuming a multi-carrier communication system, e.g. employing OFDM, as for example discussed in the "Long Term Evolution" work item of 3GPP, the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as exemplified in FIG. 4. In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see 3GPP TS 36.211, "Evolved Universal Terrestrial Radio Access (E-UTRA); Physical Channels and Modulation (Release 8)", version 8.7.0, section 6.2, available at http://www.3gpp.org and incorporated herein by reference).

General Structure for Downlink Physical Channels

The general downlink LTE baseband signal processing according to 3GPP TS 36.211, "Evolved Universal Terrestrial Radio Access (E-UTRA); Physical channels and modulation", version 8.6.0, March 2009, section 6.3 (available at http://www.3gpp.org and incorporated herein by reference) is exemplarily shown in FIG. 6. Further details on the LTE downlink can be found in 3GPP TS 36.211, section 6. A block of coded bits is first scrambled. Up to two code words can be transmitted in one sub-frame.

In general, scrambling of coded bits helps to ensure that receiver-side decoding can fully utilize the processing gain provided by channel code. For each codeword, by applying different scrambling sequence for neighboring cells, the interfering signals are randomized, ensuring full utilization of the processing gain provided by the channel code. The scrambled bits are transformed to a block of complex modulation symbols using the data modulator for each codeword. The set of modulation schemes supported by LTE downlink includes QPSK, 16-QAM and 64-QAM corresponding to 2, 4 or 6 bits per modulation symbol.

Layer mapping and precoding are related to MIMO applications. The complex-valued modulation symbols for each of the code words to be transmitted are mapped onto one or several layers. LTE supports up to four transmit antennas. The antenna mapping can be configured in different ways to provide multi antenna schemes including transmit diversity, beam forming, and spatial multiplexing. Further the resource block mapper maps the symbols to be transmitted on each antenna to the resource elements on the set of resource blocks assigned by the scheduler for transmission. The selection of resource blocks depends on the channel quality information.

Downlink control signaling is carried out by three physical channels:
  PCFICH to indicate the number of OFDM symbols used for control signaling in a sub-frame (i.e. the size of the control channel region)
  PHICH which carries downlink ACK/NACK associated with UL data transmission
  PDCCH which carries downlink scheduling assignments and uplink scheduling assignments.

Downlink Reception in 3GPP LTE

In 3GPP LTE (Release 8), where there is only once component carrier in uplink and downlink, the PCFICH is sent at a known position within the control signaling region of a downlink sub-frame using a known modulation and coding scheme. As the determination of the downlink resources assigned to the user equipment depends on the size of the control signaling region of the sub-frame, i.e. the number of OFDM symbols used for control signaling in the given sub-frame, the user equipments needs to decode the PCFICH in order to obtain the signaled PCFICH value, i.e. the actual number of OFDM symbols used for control signaling in the sub-frame.

If the user equipment is unable to decode the PCFICH or obtains an erroneous PCFICH value, this PCFICH detection error will result in the user equipment not being able to correctly decode the L1/L2 control signaling (PDCCHs) comprised in the control signaling region, so that all resource assignments contained therein are lost.

Physical Downlink Control Channel (PDCCH) Assignment

The physical downlink control channel (PDCCH) carries scheduling grants for allocating resources for downlink or uplink data transmission. Each scheduling grant is defined based on Control Channel Elements (CCEs). Each CCE corresponds to a set of Resource Elements (REs). In 3GPP LTE, one CCE consists of 9 Resource Element Groups (REGs), where one REG consists of four REs.

The PDCCH is transmitted on the first one to three OFDM symbols within a sub-frame. For a downlink grant on the physical downlink shared channel (PDSCH), the PDCCH assigns a PDSCH resource for (user) data within the same sub-frame. The PDCCH control channel region within a sub-frame consists of a set of CCE where the total number of CCEs in the control region of sub-frame is distributed throughout time and frequency control resource. Multiple CCEs can be combined to effectively reduce the coding rate of the control channel. CCEs are combined in a predetermined manner using a tree structure to achieve different coding rate.

In 3GPP LTE, a PDCCH can aggregate 1, 2, 4 or 8 CCEs. The number of CCEs available for control channel assignment is a function of several factors, including carrier bandwidth, number of transmit antennas, number of OFDM symbols used for control and the CCE size, etc. Multiple PDCCHs can be transmitted in a sub-frame.

On a transport channel level, the information transmitted via the PDCCH is also refereed as L1/L2 control signaling. L1/L2 control signaling is transmitted in the downlink for each user equipment (UE). The control signaling is commonly multiplexed with the downlink (user) data in a sub-frame (assuming that the user allocation can change from sub-frame to sub-frame). Generally, it should be noted that user allocation might also be performed on a TTI (Transmission Time Interval) basis where the TTI length (in the time domain) is equivalent to either one or multiple sub-frames. The TTI length may be fixed in a service area for all users, may be different for different users, or may even by dynamic for each user. Generally, then the L1/L2 control signaling needs only be transmitted once per TTI.

Furthermore, the PDCCH information sent on the L1/L2 control signaling may be separated into the Shared Control Information (SCI) and Downlink Control Information (DCI).

For further information on the LTE physical channel structure in downlink and the PDSCH and PDCCH format, see St. Sesia et al., "LTE—The UMTS Long Term Evolution", Wiley & Sons Ltd., ISBN 978-0-47069716-0, April 2009, sections 6 and 9.

Physical Control Format Indicator Channel (PCFICH) Assignment

The physical control format indicator channel (PCFICH) carries information about the number of OFDM symbols used for transmission of PDCCHs in a sub-frame. The set of OFDM symbols possible to use for PDCCH in a sub-frame is given by Table 1 below.

TABLE 1

| Subframe | Number of OFDM symbols for PDCCH when $N_{RB}^{DL} > 10$ | Number of OFDM symbols for PDCCH when $N_{RB}^{DL} \leq 10$ |
| --- | --- | --- |
| For normal transmission in FDD case | 1, 2, 3 | 2, 3, 4 |

As seen from Table 1, the PCFICH values depend on bandwidth of the component carrier. Table 2 below is highlighting some exemplary transmission scenarios and the typical setting of the PCFICH value for each scenario.

TABLE 2

| Subframe | Number of OFDM symbols for PDCCH when $N_{RB}^{DL} > 10$ | Number of OFDM symbols for PDCCH when $N_{RB}^{DL} \leq 10$ |
| --- | --- | --- |
| sub-frame 1 and 6 for frame structure type 2 (TDD case) | 1, 2 | 2 |
| MBSFN sub-frames on a carrier supporting both PMCH and PDSCH for 1 or 2 cell specific antenna ports | 1, 2 | 2 |
| MBSFN subframes on a carrier supporting both PMCH and PDSCH for 4 cell specific antenna ports | 2 | 2 |
| MBSFN sub-frames on a carrier not supporting PDSCH | 0 | 0 |

Further Advancements for LTE—LTE-Advanced (3GPP LTE-A)

The frequency spectrum for IMT-Advanced was decided at the World Radio communication Conference 2007 (WRC-07) in November 2008. Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved which is also referred to as "Release 10". The study item covers technology components to be considered for the evolution of E-UTRA, e.g. to fulfill the requirements on IMT-Advanced. Two major technology components which are currently under consideration for LTE-A are described in the following.

In order to extend the overall system bandwidth, LTE-A (Release 10) uses carrier aggregation, where two or more component carriers as defined for LTE (Release 8)—see FIG. 3 and FIG. 4 discussed above—are aggregated in order to support wider transmission bandwidths e.g. up to 100 MHz and for spectrum aggregation. It is commonly assumed that a single component carrier does not exceed a bandwidth of 20 MHz.

A terminal may simultaneously receive and/or transmit on one or multiple component carriers depending on its capabilities:

An LTE-Advanced (Release 10) compatible mobile terminal with reception and/or transmission capabilities for carrier aggregation can simultaneously receive and/or transmit on multiple component carriers. There is one Transport Block (in absence of spatial multiplexing) and one HARQ entity per component carrier.

An LTE (Release 8) compatible mobile terminal can receive and transmit on a single component carrier only, provided that the structure of the component carrier follows the Release 8 specifications.

It is also envisioned to configure all component carriers LTE (Release 8)-compatible, at least when the aggregated numbers of component carriers in the uplink and the downlink are same. Consideration of non-backward-compatible configurations of LTE-A (Release 10) component carriers is not precluded. Accordingly, it will be possible to configure a user equipment to aggregate a different number of component carriers of possibly different bandwidths in the uplink and the downlink.

Further in 3GPP meeting no. 57b is of the Radio Access Network working group 1 (RAN1) meeting, the following definitions of component carrier types have been agreed for LTE-A (Release 10):

Backwards Compatible Carrier:
   A carrier accessible to user equipments of all existing LTE releases.
   Can be operated as a single carrier (stand-alone) or as a part of carrier aggregation.
   For FDD, backwards compatible carriers always occur in pairs, i.e uplink and downlink.

Non-Backwards Compatible Carrier:
   If specified, a carrier not accessible to user equipments of earlier LTE releases, but accessible to user equipments of the release defining such a carrier.
   Can be operated as a single carrier (stand-alone) if the non-backwards compatibility originates from the duplex distance, or otherwise as a part of carrier aggregation.

Extension Carrier:
   If specified, a carrier that cannot be operated as a single carrier (stand-alone), but must be a part of a component carrier set where at least one of the carriers in the set is a stand-alone-capable carrier.
   It is also currently discussed, that the extension carrier could be data only-carrier i.e. without control region PDCCH Structure and Cross-Carrier Scheduling in 3GPP LTE-A As indicated above, in 3GPP LTE-A (Release 10) carrier aggregation, i.e. the use of multiple component carriers in uplink and downlink, respectively will be used. It is presently envisioned by the 3GPP to utilize cross-carrier scheduling, which means that a (single) PDCCH on one of the downlink component carriers can assign downlink (Physical Downlink Shared Channel—PDSCH) or uplink resources (on the Physical Uplink Shared Channel—PUSCH) on multiple component carriers (see 3GPP Tdoc. R1-094959, "TP for TR36.814 on downlink control signalling for carrier aggregation", agreed in the 3GPP RAN 1 meeting no. 58, available at http://www.3gpp.org and incorporated herein by reference). Motivations for the use of cross-carrier scheduling are heterogeneous network operation, support extension carrier operation, efficient scheduling in case of PDCCH CCE blocking probability, etc.

It has been agreed in the 3GPP that the PDCCH on a (downlink) component carrier can assign PDSCH resources on the same component carrier and PUSCH resources on a single linked UL component carrier. Rel-8 PDCCH structure (same coding, same CCE-based resource mapping) and DCI formats are used on each component carrier. Furthermore, the PDCCH on a component carrier can be used to assign PDSCH or PUSCH resources in one of multiple component carriers using the carrier indicator field (CIF), where 3GPP LTE (Release 8) DCI formats are extended with a fixed 3 bits carrier indicator field, and 3GPP LTE (Release 8) PDCCH structure (same coding, same CCE-based resource mapping) is reused. The presence of carrier indicator field may be semi-statically configured. FIG. 6 exemplifies the use of the carrier indicator field (CIF) for cross-carrier scheduling in a 3GPP LTE-A mobile communication network.

The motivation to support such cross carrier scheduling is:
- support data transmission on extension carrier using PDCCH in other backward/non-backward compatible carrier using the carrier indicator field.
- heterogeneous network operations: this means that a network may consist of macro eNodeB, home eNodeB, femto/pico cell. The interference scenario may vary depending on different network conditions. Hence, PDCCH may be transmitted on the component carrier which suffers less interference, typically with high power and better channel conditions. The PDSCH may still be transmitted on lower power component carriers (high interference) since the modulation and coding scheme/transport block size may be adapted to channel conditions. Further HARQ may be employed for data as well (not to control). In these scenarios, cross carrier scheduling can be employed.
- For smaller bandwidth component carriers, the control signaling region within the sub-frames is typically small, i.e. only few PDCCHs may be signaled. CCE blocking probability on such component carriers is thus higher. In this case, PDCCHs could be transmitted from other higher bandwidth component carriers (cross carrier scheduling is used).

As mentioned above, in case of downlink data assignment, a PCFICH detection error on a component carrier carrying data results in erroneous PDCCH decoding in 3GPP LTE. Using cross-carrier scheduling, the CIF field would be comprised within the PDCCH, so that one can assume that the user equipment has correctly determined the PCFICH value for the downlink component carrier carrying the PDCCH. If the PDCCH is also correctly decoded the user equipment may have obtained a "valid" resource assignment on another downlink component carrier. As will be explained in more detail herein, in order to determine the actual assigned time-frequency resources on a downlink component carrier other than that on which the PDCCH has been received (cross-carrier scheduling), the user equipment needs to also know the PCFICH value on the component carrier on which the resources are assigned. If the PCFICH value for this component carrier is incorrect, the user equipment will determine and receive data on incorrect assigned time-frequency resources.

Assuming that HARQ with soft-combining is used for transmissions on the downlink component carrier, the reception of the data on incorrect assigned time-frequency resources will lead to an incorrect decoding of the data, which will be then stored in the soft-buffer for later combining with a retransmission. As a consequence, the result will be a HARQ buffer corruption and in addition to waste of resource (i.e. additional downlink overhead due to retransmissions).

SUMMARY OF THE INVENTION

One object of the invention is to overcome the above outlined problem. More specifically, it is one object of the invention to enable cross-carrier scheduling in a mobile communication system using carrier aggregation while avoiding erroneous detection of assigned physical resources that could lead to HARQ soft buffer corruption and/or a degradation of the system throughput.

The object is solved by the subject matter of the independent claims. Advantageous embodiments of the invention are subject to the dependent claims.

One aspect of the invention is to suggest a scheme for explicitly indicating within downlink control information (DCI) the number of OFDM symbol(s) used for control signaling within a sub-frame on a component carrier on which resources are assigned by the downlink control information. The indication of the OFDM symbol(s) within the sub-frame on the assigned component carrier may for example be jointly encoded with other control signaling information, e.g. with the carrier indication of the carrier indicator field. The carrier indicator field is part of the downlink control information and is used to indicate the component carrier to which the resource assignment (comprised in a resource assignment field of the downlink control information) pertains, as well as the number of OFDM symbol(s) within the sub-frame in which the resource assignment assigns resources to the mobile terminal on the assigned component carrier that are used for control signaling. Please note that the terms downlink control information and dedicated control information are synonyms.

In this way, a degradation of downlink system throughput can be avoided in cross-carrier scheduling scenarios, and HARQ buffer corruption due to an incorrect utilization of resources can be avoided.

Some embodiments of the invention relate to the provision of a new format for downlink control information (also known as L1/L2 control signaling or PDCCH). According to one embodiment, a downlink control information format is provided for use in a mobile communication system capable of using an aggregation of component carriers (i.e. carrier aggregation) in downlink. One example of such communication system is a 3GPP LTE-A (Release 10) system; however, the invention may also be applied to further enhancements thereto.

In this embodiment, the downlink control information format comprises a resource assignment field for indicating assigned downlink resources within a sub-frame of one of the component carriers in the downlink, and a carrier indicator field for indicating on which component carrier the downlink resources are assigned, and for further indicating the number of OFDM symbols within the assigned sub-frame on the component carrier that are used for control signaling. In one exemplary implementation, the carrier indicator field has a size of 3 bits (which thus allows the indication of 8 codepoints or values).

Please note that in case the invention is implemented in a 3GPP based communication system, such as 3GPP LTE-A, the resource assignment field may consist of two or more different fields, e.g. a resource block assignment field that is indicating the resource block index or indices, i.e. assigned resource blocks, and a modulation and coding scheme field that is used for indicating the modulation and coding scheme of the data as well as their redundancy version.

In a further embodiment of the invention, the range of numbers of OFDM symbols used for control signaling that can be indicated by the bits of the carrier indicator field covers only a subset of the total range of numbers of OFDM symbols that can be used for control signaling. For instance, a sub-frame may have 0 to $N_{max}$ OFDM symbols which are used for control signaling, while the bits of carrier indicator field may only allow for indicating a sub-set of the values in the range $[0, \ldots, N_{max}]$.

This sub-set could for example depend on different parameters and/or may be configured by higher layer control signaling from the network (e.g. by the base station, the eNodeB in the 3GPP terminology). For example, the sub-set of the range of numbers of OFDM symbols used for control signaling that can be indicated by the carrier indicator field could depend on at least one of the following parameters:

- interference conditions and power level on the assigned downlink component carrier,
- the channel quality on the assigned downlink component carrier,
- the bandwidth of the assigned downlink component carrier,
- status of a load balancing function for the downlink component carriers,
- the type of the assigned downlink component carrier,
- the number of OFDM symbols used for control signaling on the component carrier on which the downlink control information is transmitted, and
- the number of downlink ACK/NACKs to be signaled on the assigned component carrier.

A further embodiment of the invention provides a method for assigning downlink resources in a sub-frame in one of a plurality of downlink component carriers to a mobile terminal. The mobile terminal receives dedicated control channel information on one of the downlink component carriers. This component carrier is also referred to as PDCCH component carrier in the following. As outlined above, the downlink control information format comprises at least a resource assignment field for indicating assigned downlink resources within a sub-frame on one of the downlink component carriers, and a carrier indicator field. The carrier indicator field indicates on which component carrier the downlink resources are assigned, and further indicates the number of OFDM symbols used for control signaling within the sub-frame on the component carrier on which downlink resources are assigned by the downlink control information. Furthermore, according to the method, the mobile terminal receives downlink data on the assigned downlink resources. It should be noted that the downlink control information may have a format according to one the different exemplary embodiments of downlink control information formats described herein.

The carrier indicator field is used to indicate on which component carrier the downlink resources are assigned, and at the same time the number of OFDM symbols that are used for control signaling on the component carrier where the downlink data is transmitted within the assigned sub-frame by means of the different codepoints (or values) that can be represented by the bits of the carrier indicator (i.e. there is joint encoding of these two types of information). In one exemplary embodiment, the codepoints representable by the carrier indicator field are divided into at least two different subsets. The respective codepoints of the subsets are mapped by the mobile terminal to different numbers of OFDM symbols used for control signaling within the sub-frame on the component carrier on which downlink resources are assigned by the downlink control information. In other words, the subsets are thus each associated to a respective number of OFDM symbols used for control signaling within the sub-frame on the component carrier on which downlink resources are assigned to the mobile terminal.

For example, if the codepoints of the carrier indicator field are divided into two subsets, a codepoint belonging to the first subset could indicate that there are $n_1 \in [0, \ldots, N_{max}]$ OFDM symbols within the assigned sub-frame on the component carrier that are used for control signaling, while a codepoint of the second subset could indicate that there are $n_2 \in [0, \ldots, N_{max}]$ OFDM symbols within the assigned sub-frame on the component carrier that are used for control signaling. Of course a corresponding scheme could be provided if the codepoints of the carrier indicator field are divided in 3, 4, or more subsets.

Apparently, the range of values out of the possible numbers of OFDM symbols for control signaling that can be signaled may be corresponding to the number of subsets, which may be limited by the size of the carrier indicator field and the number of codepoints required per subset for indicating the different component carriers for which the resource assignment in the downlink control information could be valid. Please note that the number of subsets is also depending on the number of component carriers that can be cross-scheduled by the PDCCH component carrier. In another embodiment of the invention, to obtain more flexibility in the signaling of different numbers of OFDM symbols used for control signaling, there is a plurality of different mappings pre-determined at the mobile terminal or configured in the mobile terminal by higher layer signaling. Each mapping indicates a respective mapping of the codepoints of each of the subsets to respective numbers of OFDM symbols that are used for control signaling on the assigned downlink component carrier.

Considering the example above where the codepoints of the carrier indicator field are divided into two subsets, there could be for example a first mapping $M_1$ that when used by the mobile terminal for the interpretation of the carrier indicator field would mean that a codepoint belonging to the first subset would yield $n_1 \in [0, \ldots, N_{max}]$ OFDM symbols within the sub-frame on the component carrier on which resources are assigned by the downlink control information, while a codepoint of the second subset would yield $n_2 \in [0, \ldots, N_{max}]$ OFDM symbols within the sub-frame on the component carrier on which resources are assigned by the downlink control information. If the mobile terminal uses another second mapping $M_2$, the mobile terminal would understand that a codepoint belonging to the first subset would yield $n_3 \in [0, \ldots, N_{max}]$ OFDM symbols within the sub-frame on the component carrier on which resources are assigned by the downlink control information, while a codepoint of the second subset would yield $n_4 \in [0, \ldots, N_{max}]$ OFDM symbols within the sub-frame on the component carrier on which resources are assigned by the downlink control information—please note that $n_2$ may be (but is not necessarily) equal to $n_3$.

If it is to be ensured that all combinations of numbers $(n_i, n_k)$—where $n_i, n_k \in [0, \ldots, N_{max}]$—can be indicated by the carrier indicator field for a given number S of subsets, then it would be required to define $$\binom{N_{max}+1}{S}$$

different mappings (possible mappings). However, not all possible combinations numbers $(n_i,n_k)$ of OFDM symbols used for control signaling may need to be signaled, as some of them could be unlikely to occur in a real-world communication system.

Furthermore, in one exemplary implementation, the mappings may be defined per mobile terminal. In this case the mappings specify the interpretation of the carrier indicator field irrespective of the component carrier on which the downlink resources are assigned. In other words, the mappings are thus used for determining the number of OFDM symbols for control signaling on all downlink component carriers on which resources can be assigned. In an alternative exemplary implementation, the mappings are defined per component carrier. All mobile terminals may use the same mappings for a given component carrier to determine the number of OFDM symbols for control signaling on the respective component carrier. Alternatively, there may be separate mappings defined per mobile terminal and per component carrier, which would give the highest flexibility in indicating the OFDM symbols for control signaling on the respective component carriers.

Accordingly, in another embodiment of the invention the plurality of different mappings to be configured by higher layer signaling is a subset of all possible mappings. Furthermore, in another embodiment of the invention, a respective mapping is provided for each of plural use-case scenarios that depend on at least one of:
  interference conditions and power level on the assigned downlink component carrier,
  the channel quality on the assigned downlink component carrier,
  the bandwidth of the assigned downlink component carrier,
  status of a load balancing function for the downlink component carriers,
  the type of the assigned downlink component carrier,
  the number of OFDM symbols used for control signaling on the component carrier on which the downlink control information is transmitted, and
  the number of uplink ACK/NACKs to be signaled on the assigned downlink component carrier.

In an improved embodiment of the method for assigning downlink resources in a sub-frame in one of a plurality of downlink component carriers to a mobile terminal, the mobile terminal receives a mapping selection message that is indicating which mapping out of different (configured or pre-determined) mappings is to be used for determining the number of OFDM symbols used for control signaling from the carrier indicator field of the downlink control information.

In another improved embodiment of the method for assigning downlink resources in a sub-frame in one of a plurality of downlink component carriers to a mobile terminal, the mobile terminal receives a configuration message that is indicating different mappings of the respective values in each of the subsets to the respective numbers of OFDM symbols that are used for control signaling. The mobile terminal stores or updates the mappings at the mobile terminal in response to the reception of the configuration message.

Furthermore, it should be noted that the mapping selection message and the mapping configuration message could be for example RRC signaling messages. RRC signaling messages could be specific for each component carrier (i.e. addressing all mobile terminals that use the component carrier), for example a common RRC signaling message, or could be specific to a given mobile terminal (i.e. addressing all component carriers of the mobile terminal), for example a dedicated RRC signaling message.

As mentioned previously, the time-frequency resources may be assigned to the mobile terminal on a resource block basis, wherein the assigned time-frequency resources for downlink data depend on the number of OFDM symbols being used for control signaling and the bandwidth available on the component carrier where downlink data is assigned to the mobile terminal. Accordingly, in a further embodiment of the invention, the mobile terminal is determining the resource blocks assigned to the mobile terminal within the sub-frame of the downlink component carrier from the resource assignment field and the number of OFDM symbols within the assigned sub-frame that are used for control signaling, wherein the reception of the downlink data includes receiving modulation symbols on the determined resource blocks of the sub-frame. Moreover, the mobile terminal may subsequently demodulate the received modulation symbols to obtain encoded downlink data and may further decode the encoded downlink data. The modulation and coding scheme is thereby indicated by the resource assignment field of the downlink control information.

In another embodiment of the invention, the downlink control information is received on a first downlink component carrier of the downlink component carriers and is assigning resources on another, second downlink component carrier of the downlink component carriers.

When implementing the concepts of the invention in a 3GPP LTE-A (Release 10) system or a potential further enhanced version thereof, the indicated number of OFDM symbols is corresponding to the PCFICH value. Hence, in this case the carrier indicator field is indicating on which of the downlink component carriers the downlink resources are assigned, and is further indicating the PCFICH value for the assigned sub-frame on the downlink component carrier.

Moreover, it should be noted that the invention may be advantageously be employed in a communication system using component carrier aggregation, where data is transmitted/received using a retransmission protocol using incremental redundancy/soft-combining, such as for example HARQ.

The invention further relates to the implementation of the method for assigning downlink resources in a sub-frame in one of a plurality of downlink component carriers to a mobile terminal according to one of the different embodiments of the invention described herein in hardware. This includes the provision of a mobile terminal and respective network nodes, such as a base station (eNodeB) that are suitably adapted to perform the respective steps of the method according to one of its various embodiments. In this respect, a further embodiment of the invention is providing a mobile terminal for use in a mobile communication system using an aggregation of component carriers in downlink and capable of assigning downlink resources in a sub-frame in one of a plurality of downlink component carriers. This mobile terminal comprises a receiver for receiving dedicated control channel information on one of the downlink component carriers, wherein the downlink control information format at least comprises
  a resource assignment field for indicating assigned downlink resources within a sub-frame of one of the downlink component carriers, and
  a carrier indicator field for indicating on which of the component carriers the downlink resources are assigned, and for further indicating the number of OFDM symbols within the assigned sub-frame on the component carrier that are used for control signaling.

The receiver is further adapted to receive downlink data on the assigned downlink resources. Furthermore, the receiver may consist of multiple reception circuits that are individually tuned to the carrier frequency of the respective downlink component carriers. Accordingly, when receiving a sub-frame (that is spanning across all downlink component carriers) the individual circuits receive and process (e.g. decoding, CRC check of decoded data, etc.) the resources of the sub-frame belonging to the different component carriers.

As mentioned previously, the carrier indicator field of the downlink control information may indicate at least two different subsets of codepoints representable by the bits of the carrier indicator field. The mobile terminal according to a further more advanced embodiment of the invention is comprising a processor for mapping the respective codepoints of the subsets to different numbers of OFDM symbols used for control signaling within the sub-frame on the component carrier on which downlink resources are assigned by the downlink control information using one of a plurality of different mappings. Moreover, the mobile terminal's receiver is capable of receiving higher layer signaling configuring the plurality of different mappings, wherein each mapping indicates a respective mapping of the codepoints of each of the subsets to respective numbers of OFDM symbols that are used for control signaling on the assigned downlink component carrier.

The mobile terminal according to another more advanced embodiment of the invention is comprising wherein the mobile terminal comprises a processor for mapping the respective codepoints of the subsets to different numbers of OFDM symbols used for control signaling within the sub-frame on the component carrier on which downlink resources are assigned by the downlink control information using one mapping out of a subset of a plurality of predetermined different mappings, wherein the receiver is capable of receiving higher layer control signaling configuring the subset of the plurality of different mappings to be used by the mobile terminal.

In another embodiment of the invention, the mobile terminal's processor is used to determine the resource blocks assigned to the mobile terminal within the sub-frame of the downlink component carrier from the resource assignment field and the number of OFDM symbols within the assigned sub-frame that are used for control signaling, wherein the receiver is suitably adapted to receive the downlink data on the assigned downlink resources comprises receiving modulation symbols on the determined resource blocks of the sub-frame.

The mobile terminal according to another more advanced embodiment of the invention is further comprising a demodulator for demodulating the received modulation symbols to obtain encoded downlink data and a decoder for decoding the encoded downlink data, wherein the modulation and coding scheme is indicated by the resource assignment field of the downlink control information.

Another embodiment of the invention is relating to a computer readable medium storing instructions that, when executed by the processor of a mobile terminal, cause the mobile terminal to receiving dedicated control channel information on one of a plurality of downlink component carriers, wherein the downlink control information format comprises a resource assignment field for indicating assigned downlink resources within a sub-frame of one of the downlink component carriers, and a carrier indicator field for indicating on which of the component carriers the downlink resources are assigned, and for further indicating the number of OFDM symbols within the assigned sub-frame on the component carrier that are used for control signaling; and receiving downlink data on the assigned downlink resources.

In another embodiment the computer readable medium further stores instructions that, when executed by the processor of the mobile terminal, cause the mobile terminal to perform the steps of the method for assigning downlink resources in a sub-frame in one of a plurality of downlink component carriers to a mobile terminal according to one of the various embodiments of the invention described herein.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION OF THE INVENTION

Figure 1:
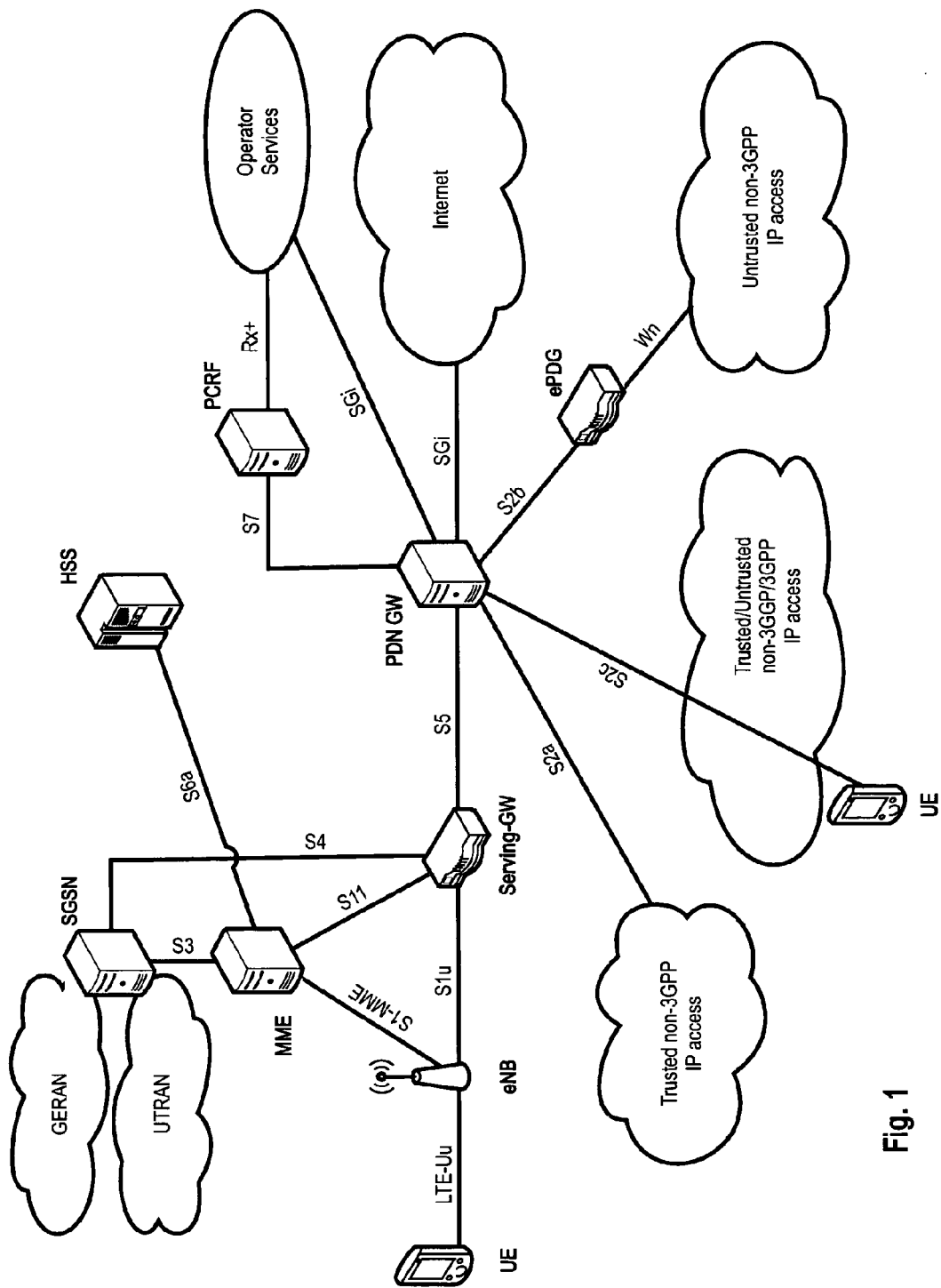
FIG. 1 shows an exemplary architecture of a 3GPP LTE system.
Figure 2:
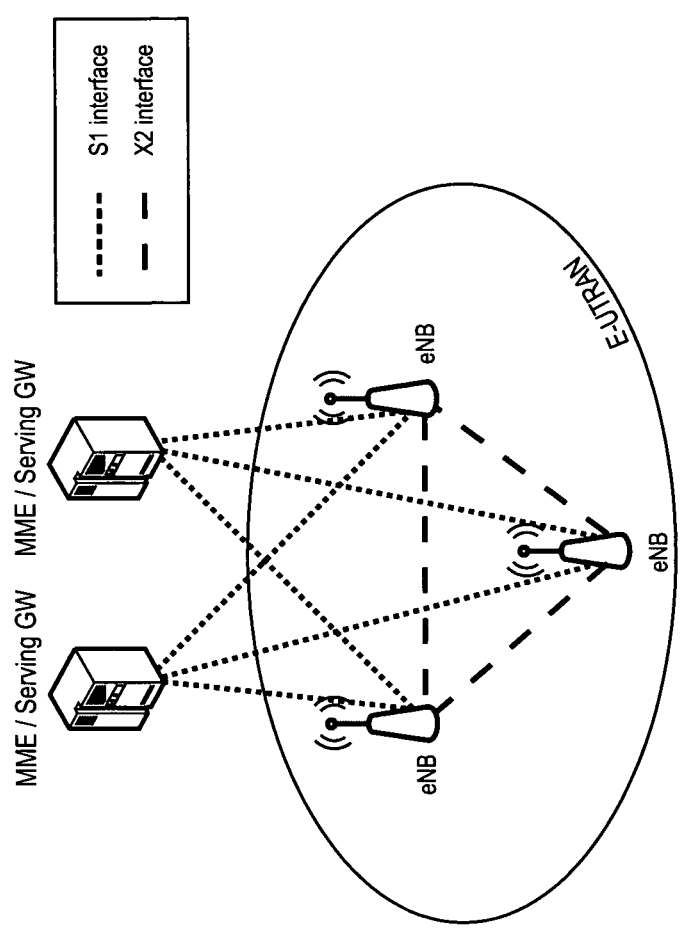
FIG. 2 shows an exemplary overview of the overall E-UTRAN architecture of 3GPP LTE.

The following paragraphs will describe various embodiments of the invention. For exemplary purposes only, most of the embodiments are outlined in relation to an orthogonal single-carrier uplink radio access scheme according to 3GPP LTE (Release 8) and LTE-A (Release 10) mobile communication systems discussed in the Technical Background section above. It should be noted that the invention may be advantageously used for example in connection with a mobile communication system such as 3GPP LTE (Release 8) and LTE-A (Release 10) communication systems previously described, but the invention is not limited to its use in this particular exemplary communication network.

The explanations given in the Technical Background section above are intended to better understand the mostly 3GPP LTE (Release 8) and LTE-A (Release 10) specific exemplary embodiments described herein and should not be understood as limiting the invention to the described specific implementations of processes and functions in the mobile communication network.

As indicated above, in case of using carrier aggregation and cross-carrier scheduling, an incorrect detection of the number of OFDM symbol(s) used for control signaling on an assigned component carrier is potentially causing not only a loss of the PDCCHs on this component carrier, but may also lead to HARQ buffer corruptions.

One possibility how to overcome this drawbacks would be to assume a fixed, known PCFICH value for transmissions on cross-scheduled component carriers by the user equipment regardless of the actual PCFICH value signaled in the cross-scheduled component carriers' control signaling regions. As the eNodeB would be aware of this user equipment behavior, it could perform appropriate rate-matching and physical-layer mapping so that the data is transmitted within the correct OFDM symbols of the sub-frame on which the user equipment assumes the transmission. One potential drawback of this solution would be performance degradation on the cross-scheduled component carrier on which the PDSCH resources are assigned as the resources are not efficiently used. Moreover, this would imply that the eNodeB needs to support two different scheduling operations for cross-carrier scheduling and no cross-carrier scheduling.

Another possible solution for the above mentioned problem is the use of an implicit PCFICH indication within the downlink control information within the PDCCHs. For example, the CRC field of the PDCCH could be masked with a PCFICH-specific user equipment identifier (UE-ID)—hence each user equipment would have to be reserved multiple UE-IDs for the different PCFICH values. This would of course imply some significant reduction of available UE IDs.

As mentioned above, a further solution is to suggest a scheme for explicitly indicating within downlink control information (DCI) the number of OFDM symbol(s) used for control signaling within a sub-frame on a component carrier on which resources are assigned by the downlink control information. In this context it may be possible to include an (additional) field to the downlink control information that indicated the number of OFDM symbol(s) used for control signaling on the cross-scheduled component carrier. This would imply additional overhead in comparison to existing DCI formats.

Another solution according to one aspect of the invention is to provide the indication of the number of OFDM symbol(s) within the sub-frame on the assigned component carrier by jointly encoding this information with other control signaling information, e.g. with the carrier indication of the carrier indicator field. Assuming that the indication of the OFDM symbol(s) for the control signaling on the component carrier is encoded together with the carrier indication of a cross-scheduled component carrier, the corresponding field in the downlink control information could be for example referred to as a joint carrier indication and PCFICH field. However, for simplicity it will be referred to the carrier indicator field in the following.

This improved carrier indicator field is part of the downlink control information and is used to indicate the component carrier to which the resource assignment (comprised in a resource assignment field of the downlink control information) pertains, as well as the number of OFDM symbol(s) within the sub-frame of the component carrier on which the downlink control information—or to be more precise resource assignment therein—assigns resources to the mobile terminal on the assigned component carrier that are used for control signaling. In other words, the invention according to this aspect of the invention is providing a new definition or re-definition of the codepoints that can be signaled in a carrier indicator field, so as to indicate the two types of information outlined above. In this way, a degradation of downlink system throughput can be avoided in cross-carrier scheduling scenarios, and HARQ buffer corruption due to an incorrect utilization of resources can be avoided without additional downlink resource overhead. Several embodiments of the invention discussed herein relate to the provision of a new format for downlink control information (also known as L1/L2 control signaling or PDCCH), respectively the new definition of the meaning of a carrier indicator field that may already existing in the downlink control information format. According to one embodiment, a downlink control information format is provided for use in a mobile communication system capable of using an aggregation of component carriers (i.e. carrier aggregation) in downlink. One example of such communication system is a 3GPP LTE (Release 10) system; however, the invention may also be applied to further enhancements thereto.

In addition, it should be also noted that the principles of the invention may also be employed for uplink data transmission in mobile communication systems using carrier aggregation in the uplink. In this case the downlink control information may still be signaled in the downlink to the mobile terminal on a given component carrier, but the resource assignment contained in the downlink control information will indicate an uplink resource on one of plural uplink component carriers, while the carrier indicator field will indicate the uplink component carrier for which the uplink resource is valid and further the number of OFDM symbol(s) to be used for control signaling in the sub-frame where the uplink data is transmitted according to the resource assignment.

In the exemplary embodiments described in the following, it is assumed that the resource assignment for a downlink transmission (or uplink transmission) is included in a resource assignment field of the downlink control information format. This resource assignment field indicates to the mobile terminal the assigned downlink (or uplink) resources within a sub-frame of one of the component carriers in the downlink (or uplink). Furthermore, the downlink control information format also includes a carrier indicator field for indicating on which component carrier the downlink (or uplink) resources are assigned, and for further indicating the number of OFDM symbols used for control signaling within the sub-frame on the component carrier on which the resources are assigned to the mobile terminal.

Figure 6:
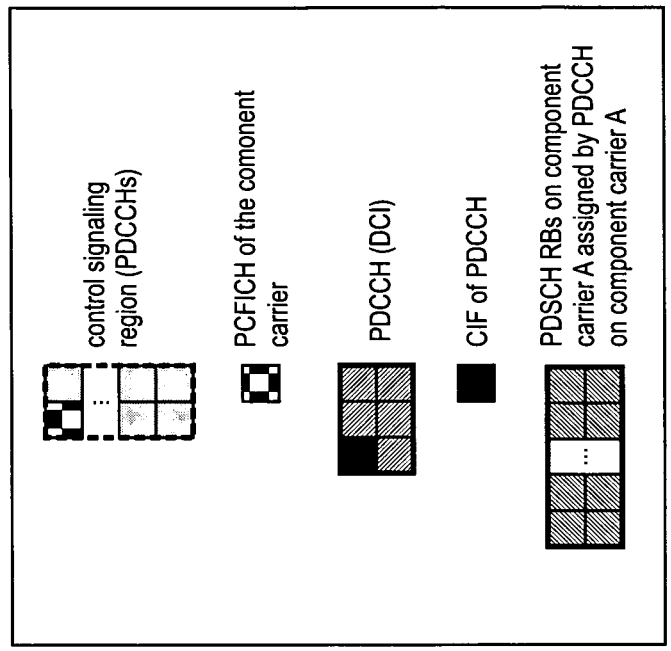
Figure 6:
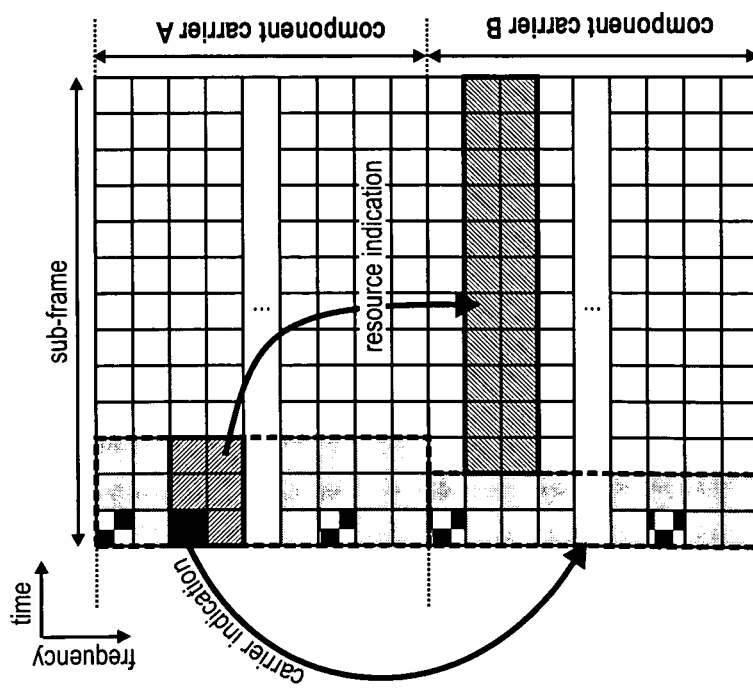
Figure 7:
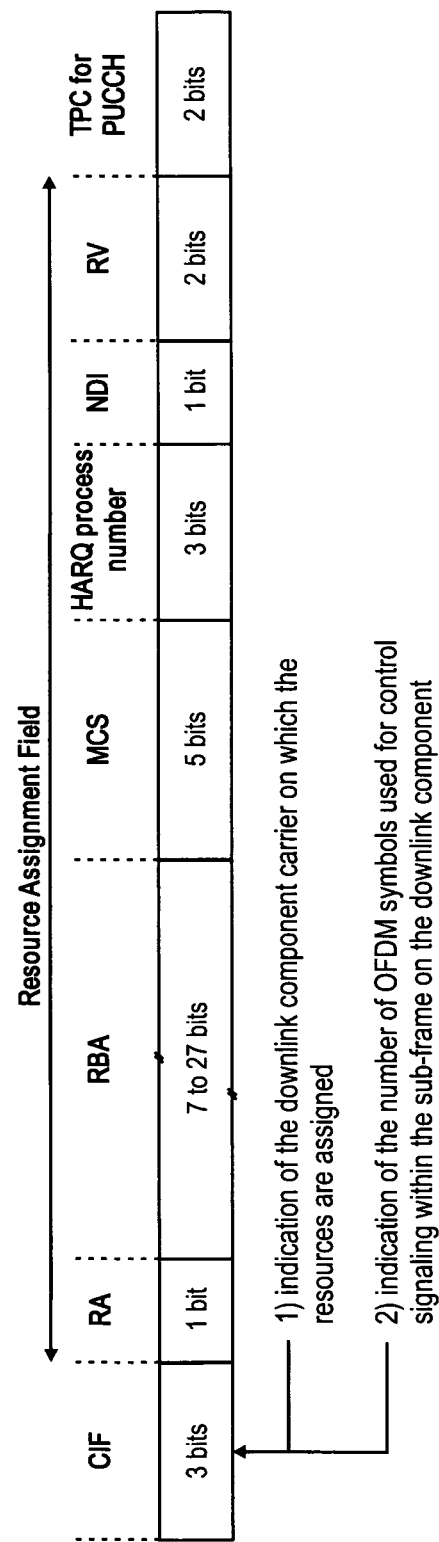
FIG. 7 shows an exemplary DCI format 1 for FDD operation according to an embodiment of the invention and for use in a 3GPP LTE-A mobile communication network.

An exemplary DCI format 1 for FDD operation according to an embodiment of the invention and for use in a 3GPP LTE-A mobile communication network is shown in FIG. 7 (please note that the CRC field is not shown for simplicity). As shown in FIG. 7 the downlink control information of these exemplary formats comprises:

a carrier indicator field (CIF) for indicating on which of the component carriers the resources are assigned, and for further indicating the number of OFDM symbols used for control signaling within the sub-frame on the component carrier on which resources are assigned by the downlink control information, resource allocation header (RA) for indicating the resource allocation type (type 0 or type 1)—please note that in case the downlink bandwidth of the component carrier on which the resources are assigned is less than or equal to 10 physical resource blocks, this header may be omitted and resource allocation type 0 is assumed, resource block assignment (RBA) field for assigning downlink resources (resource blocks) on the PDSCH to the user equipment according to the given resource allocation type. The number of bits required for the RBA field depends on the allocation type (RA field) and bandwidth of the assigned component carrier.

modulation and coding scheme field (MCS) that is indicating the modulation scheme, coding rate and the redundancy version for the transmission on the assigned resources on the PDSCH HARQ process number indicating the HARQ process to be used for the downlink transmission on the assigned resources new data indicator (NDI) flag for indicating that the transmission on the given HARQ process is a new protocol data unit (PDU)

redundancy version (RV) field for indicating the redundancy version of the downlink transmission on the assigned resources transmission power control (TPC) command field for transmission of control information on the PUCCH As further indicated in FIG. 6 the fields RA, RBA, MCS, NDI and RV are an example of an implementation of the resource assignment field mentioned previously herein.

It should be noted that the invention is not limited to the use of extended DCI Format 1 as shown in FIG. 7, but the CIF field may be added also to other DCI formats known for example from 3GPP TS 36.212, "Evolved Universal Terrestrial Radio Access (E-UTRA); Multiplexing and channel coding (Release 8)", version 8.7.0, section 5.3.3.1, available at http://www.3gpp.org and incorporated herein by reference (for examples formats 1A to 1D, 2A and 2B defined therein). Also for such extended DCI formats the CIF field may jointly encode an indication on which of the component carriers the resources are assigned, and further an indication of the number of OFDM symbols used for control signaling within the sub-frame on the component carrier on which resources are assigned by the downlink control information.

In addition the principles of the invention may be also applied to other dedicated control channel formats which may for example only contain a carrier indicator field and a resource assignment field (and optionally a CRC field to be able to verify correct decoding of these two fields at the mobile terminal).

As to the positioning of the CIF field in the DCI format, in one example same is the first field of the DCI format. However, in another exemplary implementation, the CIF field is located at another, but fixed position within the DCI format, so that the mobile terminal (user equipment) is aware of the position of the CIF field within the DCI format.

Figure 8:
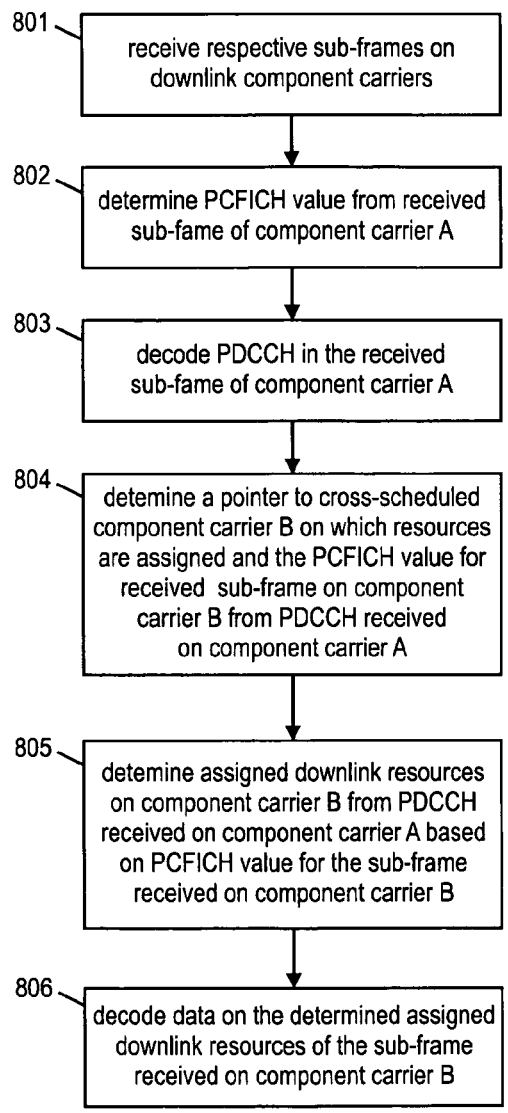
FIG. 8 shows a flow chart highlighting the steps of the mobile terminal to receive a downlink transmission in an OFDM-based mobile communication system using downlink carrier aggregation and cross-carrier scheduling according to an exemplary embodiment of the invention, FIG. 9 exemplifies the use of a carrier indicator field (CIF) for cross-carrier scheduling in a 3GPP LTE-A mobile communication network according to an embodiment of the invention, and FIG. 10 exemplifies the use of a carrier indicator field (CIF) for cross-carrier scheduling in a 3GPP LTE-A mobile communication network according to further embodiment of the invention, where there are three downlink component carriers configured for transmissions to the user equipment.
Figure 9:
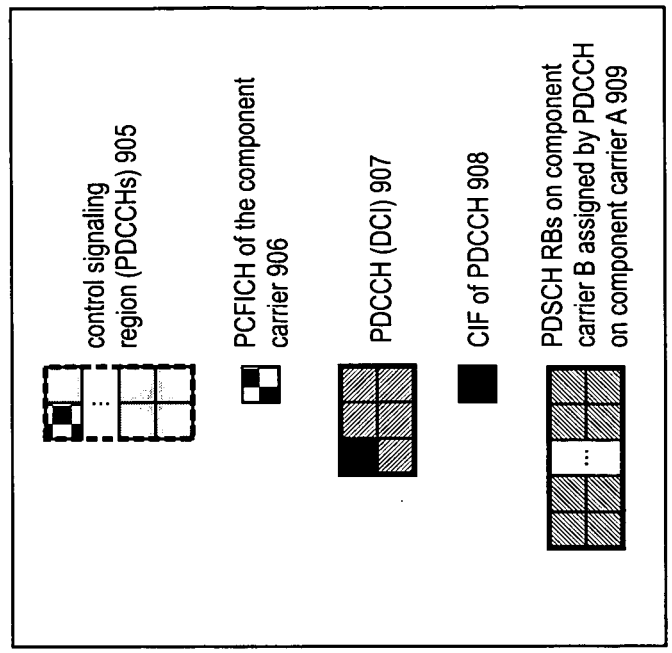
Figure 9:
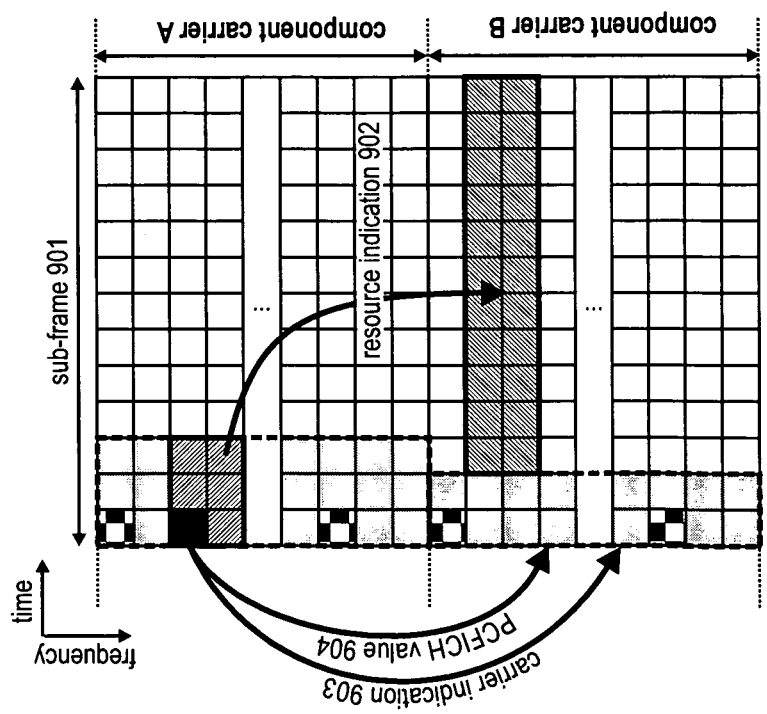

The operation of a mobile terminal receiving downlink control information according to a format defined herein will be explained with respect to FIG. 8 in the following. FIG. 8 shows a flow chart highlighting the steps of the mobile terminal to receive a downlink transmission in an OFDM-based mobile communication system using downlink carrier aggregation and cross-carrier scheduling according to an exemplary embodiment of the invention. Please note that for further details it will also be referred to FIG. 9, which is highlighting two exemplary sub-frames received by the mobile terminal (user equipment) from a base station (eNodeB) and their structure.

The mobile terminal first receives 801 the sub-frame 901 transmitted across the downlink component carriers (component carriers A and B) configured in the system and determines 802 from a sub-frame received on a first component carrier (component carrier A) the number of OFDM symbol(s) used for control signaling in the sub-frame received on component carrier A. Please note that the sub-frame is extending via all configured component carrier for the mobile terminal, but the mobile terminal may comprise independent receiver circuits to receive and process (e.g. decoding, CRC check of the decoded data, etc.) those parts of the sub-frame that belong to the different component carriers. The control information indicative of the number of OFDM symbol(s) used for control signaling in the sub-frame 901 received on component carrier A may be for example signaled at one or more time-frequency resources the position of which is fixed and known to the mobile terminal.

In a 3GPP-based system, this number of OFDM symbol(s) used for the control signaling within a sub-frame is referred to as the PCFICH value 906 that is signaled in the control signaling region 905 of component carrier A. For example, the PCFICH is signaled on known resource elements (see FIG. 3 and FIG. 4) of the sub-frame within the control signaling region 905.

Based on knowledge of the number of OFDM symbol(s) used for control signaling in the sub-frame 901 received on component carrier A, the mobile terminal is thus aware of the OFDM symbol(s) in the sub-frame 901 received on component carrier A forming the control signaling region 905 containing the control signaling for the mobile terminals and may determine whether there is a resource assignment for the mobile terminal contained therein. In FIG. 8, it is assumed that the control signaling region 905 contains downlink control information including a resource assignment (resource indication 902) for the mobile terminal on a cross-scheduled component carrier (component carrier B). The mobile terminal decodes 803 the downlink control information 907 (referred to as PDCCH or L1/L2 control signaling in the 3GPP terminology) from the sub-frame 901 received on component carrier A to obtain the downlink control information 907. In a 3GPP-based system, the downlink control information 907 obtained by the mobile terminal may for example have a format as shown in FIG. 7.

The mobile terminal next determines 804 from the carrier indicator field 908 of the downlink control information 907 received on component carrier A, a pointer (carrier indication 903) to cross-scheduled component carrier B on which resources are assigned by the downlink control information and further of the number of OFDM symbol(s) used for control signaling in the sub-frame received on component carrier B (i.e. the PCFICH value 904 for the sub-frame 901 received on component carrier B). As explained previously, the carrier indicator field 908 of the downlink control information 907 is jointly encoding the two types of information.

Being aware of the number of OFDM symbol(s) used for control signaling in the sub-frame received on component carrier B (i.e. the PCFICH value for the sub-frame received on component carrier B), the mobile terminal can determine 805 the assigned downlink resources 909 on component carrier B from a resource assignment field also comprised in the downlink control information 907 received on component carrier A.

Figure 3:
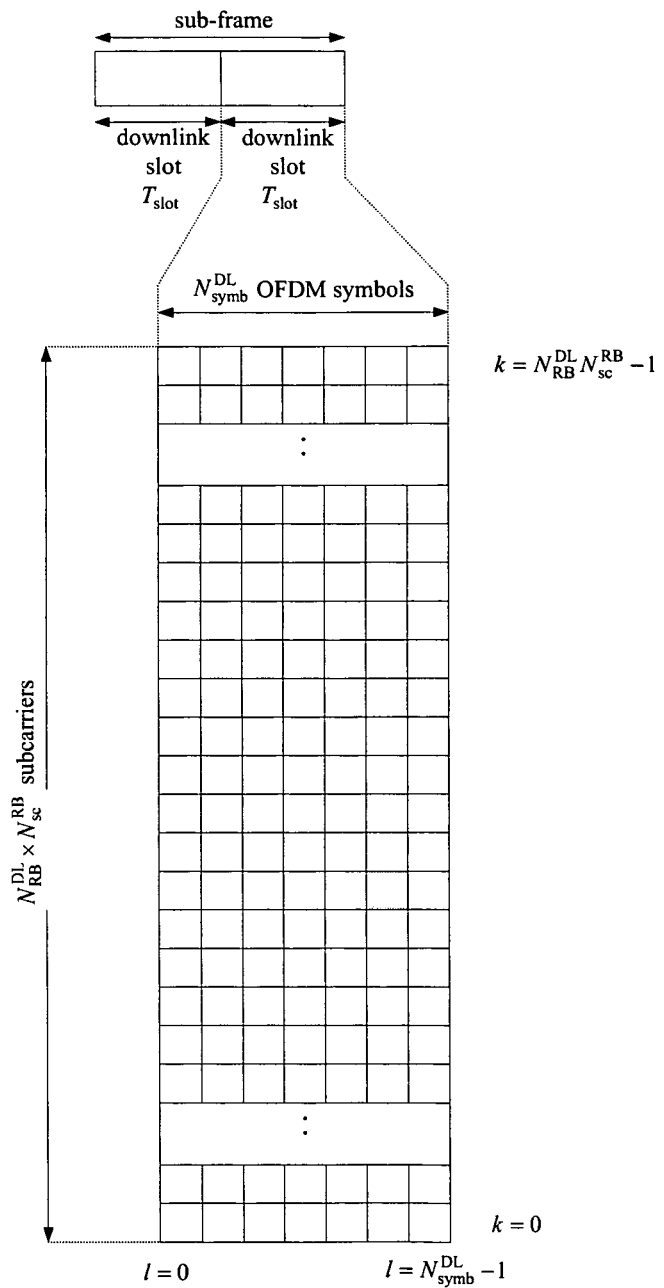
FIG. 3 shows an exemplary sub-frame structure on a downlink component carrier as defined for 3GPP LTE (Release 8)
Figure 4:
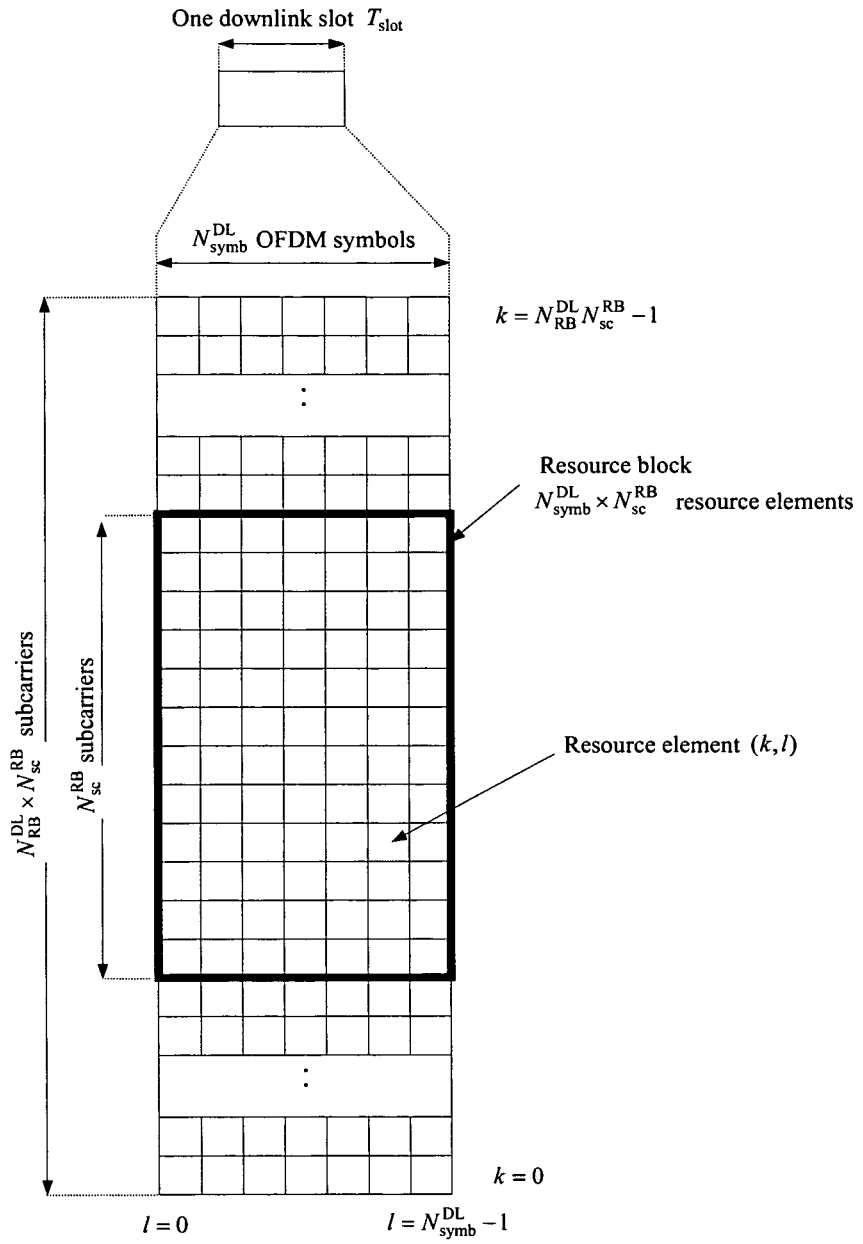
FIG. 4 shows an exemplary downlink resource grid of a downlink slot as defined for 3GPP LTE (Release 8)
Figure 5:
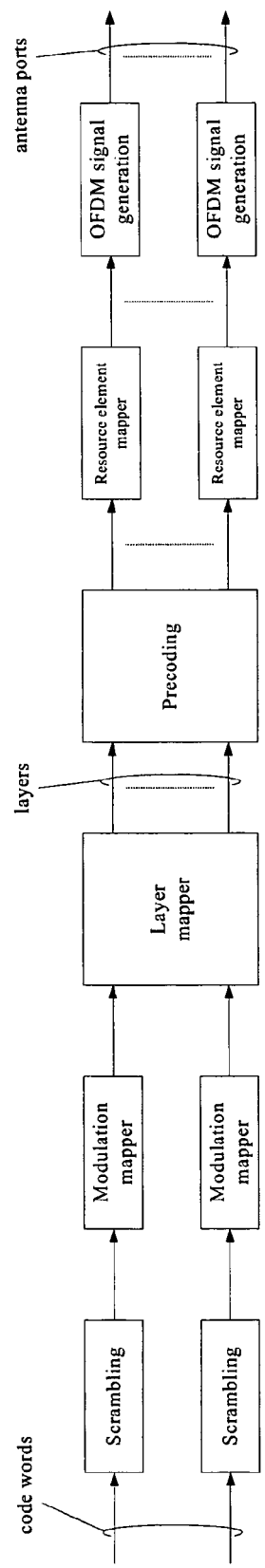
FIG. 5 shows the downlink baseband processing in LTE, FIG. 6 exemplifies the use of a carrier indicator field (CIF) for cross-carrier scheduling in a 3GPP LTE-A mobile communication network.

Considering for example a 3GPP-based system, like LTE-A (Release 10), the resource block assignment (see RA and RBA fields in FIG. 6) typically indicates the indices of the assigned resource blocks in the time-frequency grid of the sub-frame as exemplified with respect to FIG. 3 and FIG. 4. Concerning the time-domain resources of the assignment the user equipment can assume that the assignment spans— in the time domain—all OFDM symbols not used for control signaling within a sub-frame on the allocated component carrier, so that the RBA field basically indicates the frequency-domain resources being allocated (i.e. the subcarriers of the assigned resource blocks) on the component carrier. As the time-domain resources of the assignment depend on the OFDM symbol(s) used for control signaling in the sub-frame received on component carrier on which the resources are assigned to the user equipment, the knowledge of the PCFICH value for this component carrier is important to determine the resource elements of assigned resource blocks that carry the PDSCH data transmission. As the number OFDM symbol(s) used for control signaling in the sub-frame on the component carrier on which the resources are assigned is signaled within downlink control information (that are typically integrity protected by a CRC) it can be assured that the mobile terminal considers the correct PCFICH value in cross-carrier scheduling scenarios.

Accordingly, upon having determined the downlink resources from the downlink control information, the mobile terminal can decode 806 the data on the determined downlink resources in the sub-frame received on the cross-scheduled component carrier B.

Please note that the transmission of the downlink data in the example given with respect to FIG. 8 above may be transmitted using a retransmission protocol providing incremental redundancy/soft-combining. For example, a HARQ protocol can be used for this purpose. The downlink data obtained from the PDSCH resources assigned to the mobile terminal as described above are typically MAC protocol data units (PDUs). Employing a retransmission protocol providing incremental redundancy/soft-combining, MAC PDUs that have not been decoded successfully (see step 806) in the mobile terminal's decoder are not deleted by the mobile terminal, but are stored in a soft-buffer region in a memory provided at the mobile terminal for later soft-combining with retransmission(s) of the erroneous MAC PDU so that the decoder can perform decoding on the combined PDU data (combining gain can be exploited). To account for the use of a HARQ protocol, the flow chart shown in FIG. 8 would further comprise in-between steps 803 and 806 the step of determining the HARQ process number and the new data indicator (NDI) as shown in FIG. 7.

If the NDI is toggled in comparison to the previous transmission for a given HARQ process, this means that the transmission contains a new PDU, and the mobile terminal may execute steps 804, 805 and 806 as shown in FIG. 8. After decoding the transmission data in step 806 the mobile terminal further checks whether the data has been decoded successfully (this could be for example confirmed by a CRC check based on the CRC field included in each PDU) and if so, the mobile terminal's transmitter sends a (positive) acknowledgement (ACK) to the base station. If the data is not successfully decoded, the mobile terminal may store the received data in a soft-buffer region associated to the HARQ process after having flushed the soft-buffer region.

If the NDI is not toggled in comparison to the previous transmission for a given HARQ process, this means that the transmission within the presently processed sub-frame contains a retransmission for a previously transmitted PDU. In this case, the data on the on the determined assigned downlink resources of the sub-frame received on component carrier B is soft-combined with data stored in the soft-buffer region associated to the HARQ process prior to decoding the resultant data in step 806 in the mobile terminal's decoder.

Furthermore, after the decoding step, the mobile terminal may further check whether the resultant, combined data has been decoded successfully. This could be for example realized by a CRC check. If the data is not decoded successfully, the resultant, combined data is stored in the soft-buffer region associated to the HARQ process for combining with the subsequent retransmission of the PDU. If the resultant, combined data has been decoded successfully, the mobile terminal sends a (positive) acknowledgement (ACK) to the base station.

In the following, an exemplary implementation of scheme above described aspects and concepts will be given with respect to a 3GPP LTE-A (Release 10) system, where there are three downlink component carriers configured. Furthermore, for exemplary purposes only, it is assumed that the downlink assignments within the DCI (as part of a PDCCH) that are signaled on the component carrier on which they indicate reception resources to the user equipment are using the DCI format as specified in 3GPP LTE (Release 8), i.e. there is no carrier indicator field for those assignments comprised in the DCI. In case of cross-carrier scheduling, i.e. the PDCCH (including the DCI) is signaled on a different component carrier than the component carrier on which it assigns resources, an extended DCI format is used which includes a carrier indicator field (CIF) for indicating the component carrier on which the resources are assigned and the PCFICH value for this component carrier. An example for such extended DCI format is shown in FIG. 7.

Figure 10:
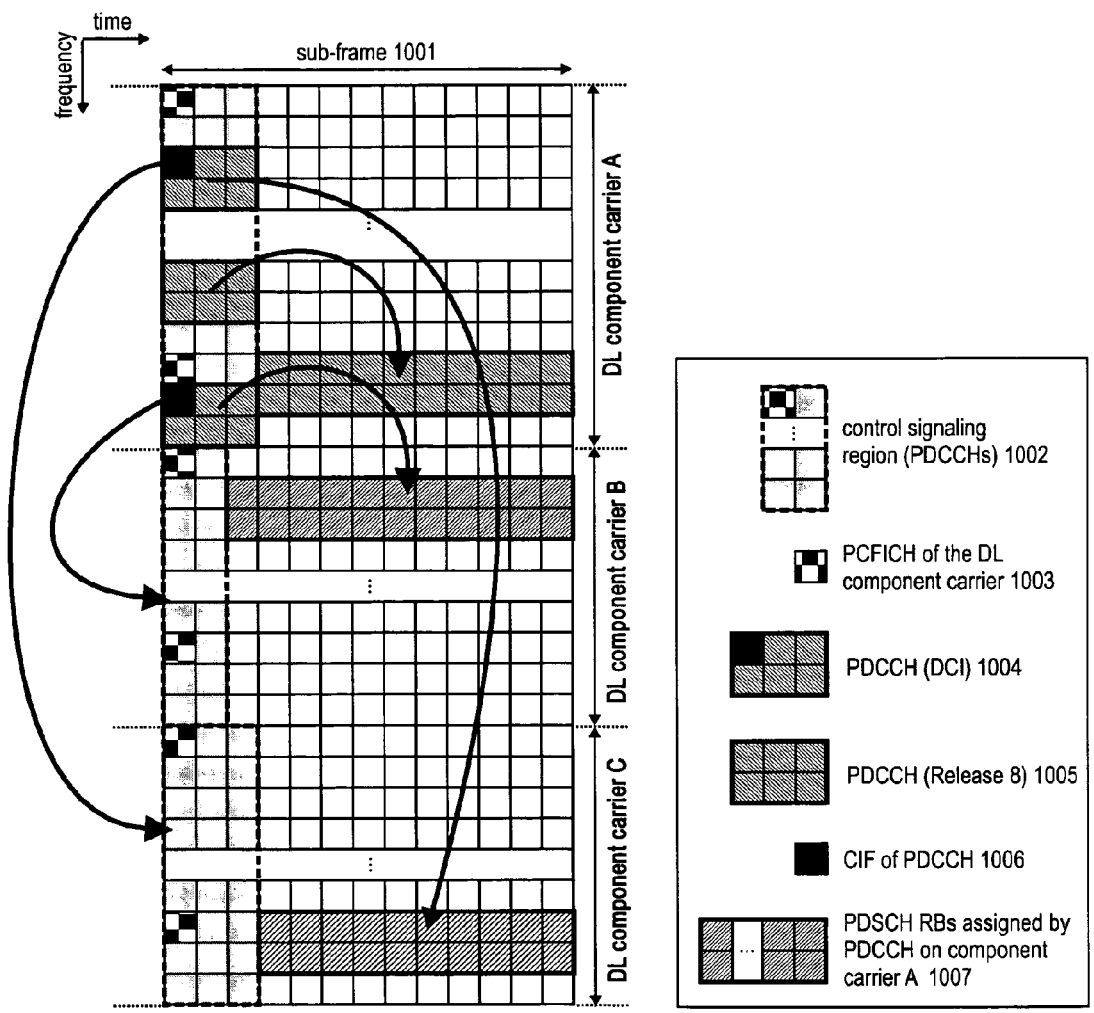

FIG. 10 exemplifies the use of a carrier indicator field (CIF) for this exemplary cross-carrier scheduling in a 3GPP LTE-A mobile communication network. As in FIG. 9, it is assumed that the component carrier A carries the PDCCHs with the resource assignments on all three component carriers A, B & C. As explained with respect to FIG. 8 and Fig above, the user equipment detects the PCFICH 1003 on component carrier A and decodes the PDCCHs in the control signaling region 1002 of component carrier A. PDCCH 1005 is assigning resources on component carrier A has 3GPP LTE (Release 8) format (the arrows indicate the component carriers on which the respective PDCCHs assign resources and the assigned resources as for FIG. 6 and FIG. 9). There are further two PDCCHs 1004 in the control signaling region 1002 of component carrier A that assign resources 1007 (cross scheduling) on component carriers B and C, respectively. These two PDCCHs 1004 have the extended DCI format and comprise a CIF field for indicating the cross-scheduled component carrier and the PCFICH value thereof. In this exemplary embodiment the mapping of the CIF values (codepoint) to the carrier indication and the PCFICH indication is defined as shown in Table 3 below.

TABLE 3

| CIF codepoint | Component Carrier Indication | PCFICH value of the indicated Component Carrier |
|---|---|---|
| 000 | Component Carrier B | 1 |
| 001 | Component Carrier C | 1 |
| 010 | Component Carrier B | 2 |
| 011 | Component Carrier C | 2 |
| 100 | Component Carrier B | 3 |
| 101 | Component Carrier C | 3 |
| 110 | Component Carrier B | 4 |
| 111 | Component Carrier C | 4 |

Hence, in the example shown in FIG. 10, the CIF field of the DCI of the PDCCH assigning resources on component carrier B would indicate the codepoint "010" and the CIF field of the DCI of the PDCCH assigning resources on component carrier C would indicate the codepoint "101". As explained with respect to FIG. 8 and FIG. 9 above, using the indicated PCFICH value 1006 of the cross-scheduled component carriers obtained from the DCI within the respective PDCCH, the user equipment can determine the assigned resources 1007 on the cross-scheduled component carriers and can receive (or transmit) the data on the correct resources.

In the exemplary scenario outlined above with respect to FIG. 10 and Table 3, it has been assumed that the PCFICH value range to be indicated is [1,2,3,4] and that the PDCCHs for cross scheduling do not need to (or cannot by convention) indicate the component carrier on which the PDCCHs are transmitted—as explained, if the PDCCH is to assign resources on the downlink component carrier on which the PDCCH is signaled (or on linked uplink component carrier to this downlink component carrier), a 3GPP LTE (Release 8) format without CIF field is used. Hence, if the CIF field has a size of 3 bits, as in the shown example, 8 codepoints exist in the CIF field and there is a matching number of 4 PCFICH values times 2 cross "schedulable" component carriers, i.e. 8 combinations of PCFICH values and component carrier indications.

Apparently, not every presently envisioned configuration of the number of aggregated component carriers and PCFICH value ranges can be signaled by the given number of codepoints that can be signaled in a CIF field within the DCI. Considering the general case that a sub-frame may have 0 to $N_{max}$ OFDM symbols which are used for control signaling (i.e. there are $N_{max}+1$ different PCFICH values for the component carriers possible). Further it can be assumed that there are $C_{CS}$ component carriers that need to be indicated within the CIF field, so as to identify the cross-scheduled component carriers. Hence there are $C_{CS} \cdot (N_{max}+1)$ combinations of component carriers and PCFICH values possible, while this number may be larger than the $2^L$, where L is the size, i.e. number of bits of the CIF field.

For example, if there are five component carriers A, B, C, D and E while PDCCHs with cross carrier assignments are—for example—signaled on component carrier A, component carriers B, C, D and E ($C_{CS}=4$) would need to be identified and there are 4 different PCFICH values possible; hence, not all combinations could be signaled using a 3 bit CIF field. Accordingly, in a further more advanced embodiment of the invention, the PCFICH value range [0, . . . , $N_{max}$] (i.e. the range of numbers of OFDM symbols used for control signaling) that can be indicated by the bits of the carrier indicator field covers only a subset of the total range of numbers of OFDM symbols that can be used for control signaling, as all $C_{CS}$ component carriers need to be unambiguously identified.

An exemplary mapping of the CIF codepoints to carrier indications and PCFICH values according to another embodiment of the invention is shown in Table 4 below.

TABLE 4

| CIF codepoint | Component Carrier Indication | PCFICH value of the indicated Component Carrier |
|---|---|---|
| 000 | Component Carrier B | 1 |
| 001 | Component Carrier C | 1 |
| 010 | Component Carrier D | 1 |
| 011 | Component Carrier E | 1 |
| 100 | Component Carrier B | 2 |
| 101 | Component Carrier C | 2 |

TABLE 4-continued

| CIF codepoint | Component Carrier Indication | PCFICH value of the indicated Component Carrier |
|---|---|---|
| 110 | Component Carrier D | 2 |
| 111 | Component Carrier E | 2 |

As can be seen in this exemplary mapping, the scheduler in the eNodeB may cross schedule resources on all four downlink component carriers B, C, D and. However there is a restriction to the PCFICH values that can be used for the respective cross-scheduled carriers. It is assumed again, that the PDCCHs with the DL DCI (downlink resource assignments) are signaled on component carrier A. For the other component carriers B, C, D and E, the CIF field may indicate PCFICH values of 1 and 2.

Furthermore, it should be noted that although in (most of) the examples above and also in the following, no codepoint is reserved for resource assignments on the component carrier on which the PDCCH including the DCI is received (e.g. a 3GPP LTE (Release 8) format for the DCI is used for the non-cross scheduling assignments), the examples may also be extended to the cases where non-cross scheduling assignments are also indicated in the CIF field—see Table 6. In this case, if a PDCCH (the resource assignment in the DCI) received on a downlink component carrier is assigning resources on the same downlink component carrier, the PCFICH value of this downlink component carrier has already been correctly detected by the user equipment, as otherwise the DCI could not be decoded correctly. Hence, if this "non-cross carrier scheduling is to be indicated in the CIF field of the DCI, only one codepoint needs to be reserved that indicates that the DCI containing the resource assignment pertains to the downlink component carrier, on which the DCI (or to be more accurate the PDCCH including the DCI) has been received.

In order to obtain more flexibility in the signaling of component carrier indications and PCFICH values in scenarios, where not all combination of these two parameters can be signaled in the CIF field, there may be different mappings defined and used by the user equipment. Considering the example above shown in Table 4, the codepoints of the carrier indicator field may be divided into two subsets, yielding each a respective PCFICH value. In one further embodiment, there are different mappings defined that indicate different PCFICH values of the codepoints belonging to a subset. For example, there could be for example a first mapping $M_1$ that when used by the user equipment for the interpretation of the carrier indicator field would mean that a codepoint belonging to the first subset {000,001,010,011} would yield a PCFICH value $n_1 \in [0, \ldots, N_{max}]$ on the component carrier on which resources are assigned by the downlink control information, while a codepoint of the second subset {100,101,110,111} would yield a PCFICH value $n_2 \in [0, \ldots, N_{max}]$ on the component carrier on which resources are assigned by the downlink control information. If the user equipment uses another second mapping $M_2$, the mobile terminal would understand that a codepoint belonging to the first subset {000,001,010,011} would yield $n_3 \in [0, \ldots, N_{max}]$ OFDM symbols within the sub-frame on the component carrier on which resources are assigned by the downlink control information, while a codepoint of the second subset {100,101,110,111} would yield $n_4 \in [0, \ldots, N_{max}]$ OFDM symbols within the sub-frame on the component carrier on which resources are assigned by the downlink control information—please note that $n_2$ may be (but is not necessarily) equal to $n_3$. In theory, if should be ensured that all combinations of numbers $(n_i, n_k)$—where $n_i, n_k \in [0, \ldots, N_{max}]$—can be indicated by the carrier indicator field for a given number S of subsets, then it would be required to define $$\binom{N_{max}+1}{S}$$

different mappings (possible mappings). However, not all possible combinations numbers $(n_i, n_k)$ of OFDM symbols used for control signaling may need to be signaled, for example, as some PCFICH values may not be needed for a given component carrier as will be explained below in further detail.

An example, on how different mappings could look like for the example of having four downlink component carriers B, C, D and E to be indicated as cross-scheduled carriers, while the PDCCHs are assumed to be signaled on the component carrier A is shown in Table 5.

TABLE 5

| CIF codepoint | Component Carrier Indication | PCFICH value of the indicated Component Carrier (Mapping $M_1$) | PCFICH value of the indicated Component Carrier (Mapping $M_2$) |
|---|---|---|---|
| 000 | Component Carrier B | 0 | 1 |
| 001 | Component Carrier C | 0 | 1 |
| 010 | Component Carrier D | 0 | 1 |
| 011 | Component Carrier E | 0 | 1 |
| 100 | Component Carrier B | 1 | 2 |
| 101 | Component Carrier C | 1 | 2 |
| 110 | Component Carrier D | 1 | 2 |
| 111 | Component Carrier E | 1 | 2 |

Please note that in the example in Table 5 only the PCFICH values indicated are varied in the different mappings.

In another example, there may be more than two subsets defined, e.g. there may be 3 or 4 subsets. The number of subsets may for example depend on the number of component carriers that need to be indicated and the size of the CIF field. For example, for a given size $2^L$ of the CIF field and $C_{CS}$ component carriers to be indicated, $S = \lfloor 2^L/C_{CS} \rfloor$ full subsets can be defined—full subset means that each subset has $C_{CS}$ codepoints to identify the different component carriers. Likewise, one could build $S' = \lceil 2^L/C_{CS} \rceil$ "incomplete" subsets—the functions $\lfloor x \rfloor$ respectively $\lceil x \rceil$ is providing the next lower respectively higher integer number to the real value x, e.g. $\lfloor 2.3 \rfloor = 2$ and $\lceil 2.3 \rceil = 3$.

As already indicated, there may be several factors that could imply that a certain sub-range of the available PCFICH values apply to a given component carrier only, so that the number of PCFICH values that need to be signaled for the respective component carriers that can be cross-scheduled can be limited. In one exemplary embodiment, there are different mappings defined for respective use scenarios, and the interpretation of the CIF is depending on the applicable use scenario, i.e. the user equipment uses the mapping corresponding to the applicable use scenario for interpreting the CIF field in the DCI. The use scenario could be for example signaled in a mapping selection message from the eNodeB to the user equipment. For example, the use scenarios or interpretation of the carrier indicator field, i.e. the mapping of the field's codepoints to their meaning could depend on at least one of:

interference conditions and power level on the assigned downlink component carrier,
the channel quality on the assigned downlink component carrier,
the bandwidth of the assigned downlink component carrier,
status of a load balancing function for the downlink component carriers,
the type of the assigned downlink component carrier,
the number of OFDM symbols used for control signaling on the component carrier on which the downlink control information is transmitted, and
the number of uplink ACK/NACKs to be signaled on the assigned downlink component carrier.

In the following some exemplary use scenarios will be outlined in further detail.

Scenario 1: HetNet/Hot Spot Scenario

In this example, it is assumed that there is one downlink component carrier which experiences only low interference (high power condition) and that there are further component carriers in the downlink that are in low power conditions due to high interference. It can be assumed that the signaling of the PDCCH including the DCI from the eNodeB to the user equipment should be highly reliable. Unreliable PDCCH would cause waste of both control signaling resources and large amount of data resources, which further implies a significantly increased downlink signaling overhead. Hence, the eNodeB typically transmits the PDCCH(s) on a component carrier with high reception power, i.e. low interference. This means, there might be only few (or even no) PDCCHs transmitted on lower power component carriers. Data on the PDSCH could still be transmitted on such lower power, i.e. high interference component carriers, since in case of using adaptive modulation and coding (AMC), the modulation and coding scheme/transport block size for the data could be adapted to the channel conditions and moreover HARQ operation could be employed as well.

Consequently, for these "lower power component carriers" (a lower power component carrier is a component carrier of which the channel quality on a component carrier is below a threshold value and/or interference level on the component carrier is above a given threshold value), the control signaling region within the sub-frames may be small which results in small PCFICH values. Hence, the PCFICH value is for example either 1 or 2 for these lower power component carriers (or even 0, i.e. there would be no control signaling region on the lower power component carrier), i.e. PCFICH values of 3 and 4 are not required to be supported and may thus not need to be indicated by the CIF field if resources are cross-scheduled on these lower power component carriers. Hence, a 3 bits CIF field for cross carrier indication to four component carriers could be supported $(4 \cdot 2 = 8 = 2^3)$. Essentially, Table 4 is yielding an exemplary mapping for this use scenario.

In a further embodiment of the invention, a CIF codepoint for the non-cross carrier scheduling case is reserved, e.g. for cases where the CIF field is present in all DCI formats, i.e. also in cases where the DCI assigns a resource on the downlink component carrier on which the DCI is received. Hence, in this example seven codepoints for cross carrier indication would be available when assuming a 3 bits CIF field and a total of five component carriers in the downlink. In this case, e.g. for one out of four component carriers that can be cross-scheduled only a single PCFICH value may be defined. An exemplary mapping is exemplified in Table 6.

TABLE 6

| CIF codepoint | Component Carrier Indication | PCFICH value of the indicated Component Carrier |
|---|---|---|
| 000 | Component Carrier A (no cross carrier scheduling) | not applicable |
| 001 | Component Carrier B | 1 |
| 010 | Component Carrier C | 1 |
| 011 | Component Carrier D | 1 |
| 100 | Component Carrier E | 1 |
| 101 | Component Carrier B | 2 |
| 110 | Component Carrier C | 2 |
| 111 | Component Carrier D | 2 |

In a further exemplary embodiment, there may be again five downlink component carriers available. Two of these component carriers are higher power component carriers (a higher power component carrier is a component carrier of which the channel quality on a component carrier is above or equal to a threshold value and/or interference level on the component carrier is below or equal to a given threshold value), so that the PDCCHs with the DCI (resource assignments) are signaled on these two component carriers A and B. Hence, in this case the CIF codepoints are may indicate multiple PCFICH values for cross carrier scheduling on component carriers C, D and E only, since a cross carrier resource assignment between component carrier A and component carrier B is not used, since the respective PDCCH can be transmitted on the component carrier A or B on which the resource should be assigned. Two exemplary mappings for this scenario are shown in Table 7 and Table 8. Table 7 shows an example where non-cross carrier scheduling is also indicated in the CIF.

TABLE 7

| CIF codepoint | Component Carrier Indication | PCFICH value of the indicated Component Carrier |
|---|---|---|
| 000 | Component Carrier A/B (no cross carrier scheduling) | not applicable |
| 001 | Component Carrier C | 1 |
| 010 | Component Carrier D | 1 |
| 011 | Component Carrier E | 1 |
| 100 | Component Carrier C | 2 |
| 101 | Component Carrier D | 2 |
| 110 | Component Carrier E | 2 |
| 111 | Component Carrier C | 0 |

Table 8 shows an example where non-cross carrier scheduling is not indicated in the CIF, i.e. only cross carrier scheduling is indicated and a 3GPP LTE (Release 8) format of the DCI is used for resource assignments on the component carrier A and B, when assigning resources on the respective component carrier.

TABLE 8

| CIF codepoint | Component Carrier Indication | PCFICH value of the indicated Component Carrier |
|---|---|---|
| 000 | Component Carrier C | 1 |
| 001 | Component Carrier D | 1 |
| 010 | Component Carrier E | 1 |
| 011 | Component Carrier C | 2 |

TABLE 8-continued

| CIF codepoint | Component Carrier Indication | PCFICH value of the indicated Component Carrier |
|---|---|---|
| 100 | Component Carrier D | 2 |
| 101 | Component Carrier E | 2 |
| 110 | Component Carrier C | 0 |
| 111 | Component Carrier D | 0 |

Scenario 2: Backward Compatible Component Carriers with Smaller Bandwidth

In current 3GPP LTE (Release 8) systems, a PCFICH value of 4 is used only for smaller bandwidth (e.g. less then a threshold number of resource blocks or a threshold bandwidth—for example 10 resource blocks which is equivalent to a bandwidth of 1.6 MHz). This is because in LTE systems offering only a small bandwidth the number of REGs (CCEs) per OFDM symbol is small, so that the control signaling region within the sub-frames in terms of OFDM symbols is increased compared to larger bandwidths systems (usually having a maximum PCFICH value of 3).

As the control region is larger in smaller bandwidth component carriers, those smaller bandwidth component carrier could be used a backwards compatible carriers within a 3GPP LTE-A (Release 10) carrier aggregation scenario, where the smaller bandwidth carrier is used for only for LTE (Release 8) compatible user equipments. In this scenario, the L1/L2 control signaling (PDCCHs) for only those LTE (Release 8) compatible user equipments is transmitted in the control signaling region of the smaller bandwidth component carrier(s), while cross-carrier scheduling is used for 3GPP LTE-A (Release 10) compatible user equipments to assign resources to 3GPP LTE-A (Release 10) compatible user equipments on the smaller bandwidth component carrier(s). As the control signaling region on the small bandwidth component carrier(s) will be typically large as less CCEs are available and hence a larger number of OFDM symbols for control signaling is required. Therefore, in this embodiment, the mapping of the CIF field could be chosen so as to yield only PCFICH values of 3 or 4 when resources are cross-scheduled on the smaller bandwidth component carrier(s) to the 3GPP LTE-A (Release 10) compatible user equipments.

Scenario 3: eNodeB Distributes PDCCH Evenly Across all Component Carriers

In this exemplary use scenario, the eNodeB employs load balancing on all component carriers in the system, so that the PDCCH(s) are mapped evenly across all component carriers available in the downlink. Hence, in this scenario, the PCFICH value which is to be indicated for PDSCH component carrier when using cross scheduling could be configured based on PCFICH on component carrier carrying the PDCCH with the corresponding cross scheduling resource assignment (referred to as the PDCCH component carrier in the following).

For example, if the PCFICH value for the PDCCH component carrier is 1, the PCFICH values that can be signaled for the cross-scheduled component carrier on which the resources are assigned are 1 and 2. If the PCFICH value of the PDCCH component carrier is 2 or 3, the PCFICH value that can be signaled for the cross-scheduled component carrier on which the resources are assigned is either 2 or 3. Table 9 shows an exemplary mapping of the CIF codepoints to the component carrier indication and the PCFICH value of the cross-scheduled component carrier based on the PCFICH value of the PDCCH component carrier.

TABLE 9

| CIF codepoint | Component Carrier Indication | PCFICH value of the indicated Component Carrier | |
|---|---|---|---|
| | | PCFICH value of the PDCCH component carrier is 1 | PCFICH value of the PDCCH component carrier is 2 or 3 |
| 000 | Component Carrier B | 1 | 2 |
| 001 | Component Carrier C | 1 | 2 |
| 010 | Component Carrier D | 1 | 2 |
| 011 | Component Carrier E | 1 | 2 |
| 100 | Component Carrier B | 2 | 3 |
| 101 | Component Carrier C | 2 | 3 |
| 110 | Component Carrier D | 2 | 3 |
| 111 | Component Carrier E | 2 | 3 |

It should be noted that it may be preferable that the case that for a PCFICH value of 2 on the component carrier A. the PCFICH values 1, 2 or 3 can be indicated in the CIF field, however, for reducing the overhead, signaling only 2 or 3 may be acceptable for this case.

It should be noted in general, that a PCFICH value that cannot be signaled may still be used on the respective cross-scheduled component carriers. In this the eNodeB's scheduler needs to assure that there is not data mapped to those OFDM symbol(s) (e.g. using rate matching) that in reality are not in the control signaling region of the component carrier, but that are assumed to be part of it by the user equipment, due to being only able to signal an incorrect PCFICH value for cross-scheduling on this component carrier due to the given mapping.

From a more general point of view, one could consider this scheme a mapping of the CIF codepoints of the available S subsets to the PCFICH values such that a first subset is mapped to the same PCFICH value $PCFICH_{PDCCH\ CC}$ as used for the PDCCH component carrier, while the other subsets are mapped to a PCFICH values of $PCFICH_{PDCCH\ CC}+O$, where O represents a certain, e.g. configurable, negative or positive integer offset. For two subsets, in one example, O=+1. For three subsets, the offset is for example O=+1 for the second subset of CIF codepoints, and O=+2 for the third subset of CIF codepoints.

In an alternative implementation, the subsets could be mapped to a PCFICH value of $PCFICH_{BW\ CC}+O$, where $PCFICH_{BW\ CC}$ is a PCFICH value pre-determined for the bandwidth (BW) of the cross-scheduled component carrier (CC), while O represents again a certain, e.g. configurable, positive or negative integer offset, as in the previous example.

As can be recognized from the discussion of three exemplary use scenarios, the PCFICH values that can be signaled by means of the CIF field are restricted based on the use case scenarios/eNodeB deployment scenarios, however, due to the smart selection of PCFICH values that can be signaled, their "restriction" does not have any significant impact on the system throughput. Further the restriction reduces the higher layer signaling overhead for configuring the mappings.

The different mappings, especially in the examples where there are different mappings to be configured and selected from for use by the user equipment, may be for example signaled to the user equipment from the eNodeB using a RRC signaling message (e.g. a mapping configuration message).

Similar, the eNodeB could for example use a RRC signaling message (mapping selection message) to indicate to the user equipment, which mapping should be used for interpreting the CIF field of the DCI. In some embodiments, the eNodeB may indicate one of plural predetermined use scenarios (see examples above) using RRC signaling that imply the PCFICH values/mapping of CIF codepoints according to the configuration provided for the given use scenario. Furthermore, a combined mapping configuration and selection message, which is implementing both functions, could be used.

Alternatively, the selection of the mapping to be used for interpreting the CIF field within the DCI may be done by the user equipment based on common understanding between eNodeB and user equipment. Such common understanding may be for example predetermined by specifying a UE procedure in the relevant standardization documents.

For example, the user equipment may select an appropriate mapping according on the bandwidth of the cross-scheduled component carrier, the transmit power level, or the like. Alternatively the scenario could be derived from parameters signaled in the RRC signaling message (e.g. bandwidth, component carrier type, PDCCH monitoring set, etc.)

In a further alternative embodiment, there is no pre-configured number of mapping and selection of one of the mappings for use, but rather the eNodeB signals the mapping to be used by the user equipment by means of a RRC signaling message and the user equipment employs the signaled mapping for interpreting the CIF field in the DCI.

As already indicated previously, in order to obtain more flexibility in the signaling of PCFICH values on the cross-scheduled component carriers within the CIF field of the DCI, plural mappings of the CIF codepoints could be provided, and the user equipment either autonomously (according to some defined UE procedure) or based on some signaling message from the eNodeB selects on of the mappings for interpreting the CIF field.

Again exemplarily assuming five downlink component carriers and a CIF field size of three bits, two different PCFICH values could be indicated. Accordingly, for example using RRC signaling the eNodeB could configure mappings for all combinations of PCFICH values as exemplified in Table 10 below. Please note that the 8 CIF codepoints are assumed to be divided into two subsets, each subset consisting of 4 of the 8 values and being associated to one of the four component carrier that can be cross-scheduled (i.e. the four component carriers that are not corresponding to the PDCCH component carrier).

TABLE 10

| | Meaning of CIF codepoints | |
|---|---|---|
| | if in first subset of CIF codepoints indicate a PCFICH value of . . . | if in second subset of CIF codepoints indicate a PCFICH value of . . . |
| Mapping 1 | 1 | 0 |
| Mapping 2 | 1 | 2 |
| Mapping 3 | 1 | 3 |
| Mapping 4 | 1 | 4 |
| Mapping 5 | 2 | 0 |
| Mapping 6 | 2 | 3 |
| Mapping 7 | 2 | 4 |
| Mapping 8 | 3 | 0 |
| Mapping 9 | 3 | 4 |
| Mapping 10 | 4 | 0 |

As seen from the Table 10, all possible combinations of PCFICH values can be signaled using the 10 mappings. RRC message for selecting one of the mappings for use by the user equipment could be signaled from the eNodeB to the user equipment. For this full flexibility in the PCFICH value signaling, 4 bits in the selection message would be required to signal one of the 10 mappings ($4=\lceil \log_2 10 \rceil$).

However, for scenarios where there are more than five component carriers configured in the downlink, respectively the number of component carriers that can be cross-scheduled is increasing, it becomes more likely that different PCFICH value combinations are applicable to different component carriers and need to be signaled. For example, for component carrier B, PCFICH values according to mapping 1 may be applicable, and for component carrier C, mapping 2 may be applicable, etc. This may lead to a significant increase in the overhead and the mapping configuration message would need to signal a very high number of mappings.

Accordingly, in further embodiments of the invention, plural mappings may be configured; however, their number is limited so as to provide only a partial flexibility in the PCFICH value signaling for the cross-scheduled component carriers. For example, the mappings defined by RRC signaling could be limited to/by:

the definition of a number of mappings corresponding to specific use scenarios:
An RRC message could used to signal mappings for the specific use scenarios and would hence limit the possible PCFICH value combinations that can be signaled (implicitly derived based on the use scenario by user equipment, as discussed above)
component carrier labeling:
The downlink component carrier can be sorted according to their bandwidth (e.g. component carriers with small bandwidth—i.e. below a threshold value—have lower component carrier labels/IDs, and vice versa).

Larger PCFICH values (e.g. 3 and 4) may only be needed for small bandwidth component carriers. For example, assume a case of 5 downlink component carriers with 3 small bandwidth component carriers (i.e. the bandwidth is below a threshold) and 2 high bandwidth component carriers (i.e. the bandwidth is above or equal to the threshold) and assuming the PDCCH component carrier is a high bandwidth component carrier (component carrier E). Further, for the indicated PCFICH values are assumed to be 3 and 4 for small bandwidth component carriers, while the PCFICH values for the high bandwidth component carriers are assumed to be 1 or 2.

If the component carrier indexing is random, i.e. the small/high bandwidth component carriers may have any label/index between 1 and 5, the exemplary 6 mappings required as highlighted in Table 11. Please note that it is exemplarily assumed that the PDCCH component carrier has component carrier index 5. Furthermore, "½" in the table means that according to the respective mapping, a CIF codepoint according of the first subset of the CIF codepoints indicates a PCFICH value of 1 for the respective cross-scheduled component carrier, while a CIF codepoint according of the second subset of the CIF codepoints indicates a PCFICH value of 2 for the respective cross-scheduled component carrier. Likewise, "¾" in the table means that according to the respective mapping, a CIF codepoint according of the first subset of the CIF codepoints indicates a PCFICH value of 3 for the respective cross-scheduled component carrier, while a CIF codepoint according of the second subset of the CIF codepoints indicates a PCFICH value of 4 for the respective cross-scheduled component carrier.

TABLE 11

| Component Carrier Index | 1 | 2 | 3 | 4 |
|---|---|---|---|---|
| PCFICH implied by first/second subset of CIF codepoints according to mapping 1 | 1/2 | 1/2 | 3/4 | 3/4 |
| PCFICH implied by first/second subset of CIF codepoints according to mapping 2 | 1/2 | 3/4 | 1/2 | 3/4 |
| PCFICH implied by first/second subset of CIF codepoints according to mapping 3 | 1/2 | 3/4 | 3/4 | 1/2 |
| PCFICH implied by first/second subset of CIF codepoints according to mapping 4 | 3/4 | 1/2 | 1/2 | 3/4 |
| PCFICH implied by first/second subset of CIF codepoints according to mapping 5 | 3/4 | 1/2 | 3/4 | 1/2 |
| PCFICH implied by first/second subset of CIF codepoints according to mapping 6 | 3/4 | 3/4 | 1/2 | 1/2 |

If the component carrier indexing is according to the component carrier bandwidth, only one mapping scheme would be needed. For example, if the small bandwidth component carriers have low component carrier indicates indices and high bandwidth component carriers have large indices, only mapping is shown in Table 12 below could be defined.

TABLE 12

| Component Carrier Index | 1 | 2 | 3 | 4 |
|---|---|---|---|---|
| PCFICH implied by first/second subset of CIF codepoints | 3/4 | 3/4 | 3/4 | 1/2 |

Furthermore, in several of the examples above, the codepoints of a given subset of the CIF codepoints have been mapped to the same PCFICH value. Essentially, this means that there is a "common mapping" to PCFICH values for the different component carriers. In a further embodiment of the invention, the PCFICH value for the individual component carriers may be different for the different codepoints of each subset of CIF codepoints.

An example is illustrated in Table 13, assuming again for exemplary purposes that the DCI (PDCCH) is transmitted on component carrier A of five configured downlink component carriers A, B, C, D and E. For example, component carriers B and C could be two high bandwidth component carriers (e.g. 15 MHz or 20 MHz) so that the control signaling region on these component carriers is typically spanning only 1 or 2 OFDM symbols, while component carriers D and E may be for example backwards compatible component carriers (optionally of low bandwidth, e.g. 5 MHz), where the control signaling region is likely spanning 3 or 4 OFDM symbols of the sub-frame.

TABLE 13

| CIF codepoint | Component Carrier Indication | PCFICH value of the indicated Component Carrier |
|---|---|---|
| 000 | Component Carrier B | 1 |
| 001 | Component Carrier C | 1 |
| 010 | Component Carrier D | 3 |
| 011 | Component Carrier E | 3 |
| 100 | Component Carrier B | 2 |
| 101 | Component Carrier C | 2 |
| 110 | Component Carrier D | 4 |
| 111 | Component Carrier E | 4 |

In another exemplary embodiment enabling a more flexible, component-carrier dependent mapping of the CIF codepoints to PCFICH values is that a plurality of mappings could be either pre-configured or configured by the eNodeB, as previously discussed, and the eNodeB could then send a RRC signaling message (mapping selection message) to the user equipment to identify for each component carrier the mapping to be used by the user equipment for interpreting the meaning of the codepoints in the CIF field. For example, in one implementation the eNodeB and user equipment could aggregate the available downlink component carriers in terms of bandwidth (e.g. in ascending order of bandwidth of different downlink component carriers) so that eNodeB and user equipment have the same order of component carriers, so that they become "addressable" and can be assigned to the different mappings.

In one example, the eNodeB could simply signal for the $1^{st}$ half of component carriers some mapping tables indicating larger PCFICH values (e.g. 3 or 4 or even higher) for the smaller bandwidth component carriers require and could further signal for the $2^{nd}$ half of the component carriers some mapping tables that indicate smaller PCFICH values (e.g. 0, 1, or 3) for the larger bandwidth component carriers. Also some combination of component carriers might require mix of both small/large PCFICH values, which could be realized according to this exemplary embodiment.

In a further embodiment, system broadcast information (SIB) that are commonly broadcast within the individual cells of the radio access network are used to derive the use scenario and related selection of the corresponding mapping scheme for the CIF field within the DCI at the mobile terminal. In this embodiment, the mobile terminal receives the system broadcast information that contains one or more parameters allowing the mobile terminal to determine the use scenario applicable in the radio cell and the mobile terminal further selects the mapping to be used for the CIF field based on the detected use scenario.

For example, the bandwidth of the uplink/downlink component carriers is typically broadcast by the master information. For example, in a 3GPP based network, this parameter is contained in the Master Information Block (MIB). Furthermore, the frequency band of the respective component carriers is indicated in the element "freqBandIndicator" included in system information block SIB1. Based on one or more of these parameters, the mobile terminal (user equipment) can determine which subset of PCFICH values is indicated in the CIF of the DCI.

In another embodiment, new system information may be broadcast that allow the mobile terminal to select the appropriate mapping of the CIF codepoints. For example, considering a 3GPP LTE-A (Release 10) system parameters transmitted from which scenario is derived could be for example the component carrier type (backward/non-backward/extension carrier). The component carrier type could be broadcasted to all user equipments in a radio cell for example within the system broadcast information. However for extension carriers, there could be no broadcast message transmitted. For the extension carriers, the component carrier type may therefore be transmitted to the user equipment by means of a dedicated RRC connection reconfiguration message. It could also be possible that component carrier type in general (irrespective of backward/non-backward compatible/extension carrier) is always signaled using dedicated RRC message.

Furthermore, it should be noted that instead of system information broadcast, also the dedicated RRC signaling messages could be used to provide the desired parameters to the user equipment, so that the user equipment can derive the use scenario, respectively the mapping to be used for interpreting the CIF codepoints in the DCI. If the user equipments in a cell may be allowed to aggregate different numbers of downlink and uplink component carriers with different bandwidths, dedicated RRC signaling may be more appropriate to use, as this allows addressing the configurations of the individual user equipments. Hence, in one exemplary implementation, the number of DL/UL component carriers and the corresponding bandwidth could be signaled to each user equipment within a dedicated RRC message, and the user equipment could then select the appropriate mapping for the interpretation for the CIF in the DCI based on the indicated parameters.

In another exemplary use scenario, related to heterogeneous network operation, there may be different types of cells, e.g. macro cells, home cells, femto/pico cells, etc. that are controlled by respective macro eNodeBs, home eNodeBs, femto/pico cell eNodeBs. All these cells may partially overlap in their scope and frequency resources (e.g. a macro eNodeB may transmit data on 5 downlink component carriers, while a home eNodeB might send on two of these 5 downlink component carriers). Hence, the interference scenario resulting from this operation may vary depending on different network conditions. The PDCCHs (including the DCI with the resource assignments) should be thus preferably transmitted on a component carrier which suffers less interference, typically a component carrier with high power and better channel conditions (i.e. cross carrier scheduling should be employed). The data on the PDSCH may still be transmitted on lower power component carriers (high interference) since the modulation and coding scheme/transport block size may be adapted to channel conditions.

Consider for example a macro eNodeB which transmits and controls 5 component carriers A, B, C, D and E. Further it may be assumed that 2 component carriers A and B suffer high interference from transmission of a home eNodeB on these component carriers A and B (or on at least parts of their sub-bands). In this case, the macro eNodeB may transmit the PDCCHs including the DCI on component carriers C, D and/or E and uses cross-scheduling on these three component carriers to assign resources for data transmission on component carriers A and B.

As explained before high interference/low power component carriers A and B will not be often used by the macro eNodeB to transmit PDCCH including the DCI and hence component carriers A and B may have a small control region size, i.e a PCFICH value of 1 or 2, or even no control signaling region (PCFIVH=0) in the extreme case. Using system broadcast or a dedicated RRC message the macro eNodeB could inform the user equipments on the interference level of the configured component carriers, so that the user equipment could determine the corresponding mapping table for interpretation of CIF codepoints based on the interference levels on the respective configured component carriers.

Alternatively, since different user equipments in the macro cell controlled by the macro eNodeB may aggregate different component carriers, the macro eNodeB could also signal a PDCCH monitoring set to the user equipments to inform the respective user equipments which of the component carriers (for example component carrier C, D and E in the example above) the user equipment should monitor for PDCCH (DCI). From the signaled PDCCH monitoring set, the user equipment could determine that component carriers A and B are low power component carriers (i.e. suffer high interference) and hence the user equipment could again determine the appropriate mapping for the interpretation for the CIF codepoints in the DCI based on the indicated parameters.

In most of the previous exemplary embodiments and example mappings, there has been no restriction to the cross-scheduling mechanism that is provided by the scheduler of the eNodeB. In a further embodiment of the invention, the number of PCFICH values that may be signalled by the CIF codepoints is increased, by limiting the possibility of cross-scheduling other component carriers.

For example, and somewhat similar to the example described with respect to Table 7 and Table 8 above, one could assume that there are some (e.g. two) high bandwidth component carriers (e.g. 15 MHz or 20 MHz) that serve as "anchor carriers" and that are used to signal the PDCCHs (including the DCI) for cross-scheduling user equipments on the other downlink component carriers. E.g. the two anchor component carriers could be component carriers A and B, while the remaining downlink component carriers are indexed/labelled C, D and E.

The eNodeB could signal the DCI for cross-scheduling on component carriers C and D on component carrier A, while the DCI for cross-scheduling on component carriers D and E is sent on component carrier B. Hence, the CIF field of the DCI would only need to indicate two component carriers. Of course, it may also be possible to ensure that there is no overlap in the component carriers that can be cross-scheduled on the anchor component carriers, but this would imply an additional limitation of the scheduler in mapping the PDCCHs on the anchor component carriers, which could increase the blocking probability.

For example the following mapping shown in Table 14 could be used for interpreting the CIF field of DCI signaled on component carrier A:

TABLE 14

| CIF codepoint | Component Carrier Indication | PCFICH value of the indicated Component Carrier |
| --- | --- | --- |
| 000 | Component Carrier C | 1 |
| 001 | Component Carrier C | 2 |
| 010 | Component Carrier C | 3 |
| 011 | Component Carrier C | 4 |
| 100 | Component Carrier D | 1 |
| 101 | Component Carrier D | 2 |
| 110 | Component Carrier D | 3 |
| 111 | Component Carrier D | 4 | while the mapping shown in Table 15 could be used for interpreting the CIF field of DCI signaled on component carrier B:

TABLE 15

| CIF codepoint | Component Carrier Indication | PCFICH value of the indicated Component Carrier |
| --- | --- | --- |
| 000 | Component Carrier D | 1 |
| 001 | Component Carrier D | 2 |
| 010 | Component Carrier D | 3 |
| 011 | Component Carrier D | 4 |
| 100 | Component Carrier E | 1 |
| 101 | Component Carrier E | 2 |
| 110 | Component Carrier E | 3 |
| 111 | Component Carrier E | 4 |

Hence, on this example almost all PCFICH values (except for 0) could be indicated for the cross scheduling on component carriers C, D and E at an acceptable level of restriction for the scheduler in mapping the DCI to the anchor component carriers A and B. However when accepting a slightly higher level of restriction for the scheduler in mapping the DCI to the anchor component carriers A and B also the PCFICH value of 0 could be signaled as shown in Table 16 and Table 17, where respective partly overlapping PCFICH values for cross-scheduling on component carrier D are realized. Table 16 is used for interpreting the CIF field of a DCI received on component carrier A:

TABLE 16

| CIF codepoint | Component Carrier Indication | PCFICH value of the indicated Component Carrier |
| --- | --- | --- |
| 000 | Component Carrier C | 0 |
| 001 | Component Carrier C | 1 |
| 010 | Component Carrier C | 2 |
| 011 | Component Carrier C | 3 |
| 100 | Component Carrier C | 4 |
| 101 | Component Carrier D | 0 |
| 110 | Component Carrier D | 1 |
| 111 | Component Carrier D | 2 |

Table 17 is used for interpreting the CIF field of a DCI received on component carrier B:

TABLE 17

| CIF codepoint | Component Carrier Indication | PCFICH value of the indicated Component Carrier |
| --- | --- | --- |
| 000 | Component Carrier D | 2 |
| 001 | Component Carrier D | 3 |
| 010 | Component Carrier D | 4 |
| 011 | Component Carrier D | 0 |
| 100 | Component Carrier E | 1 |
| 101 | Component Carrier E | 2 |
| 110 | Component Carrier E | 3 |
| 111 | Component Carrier E | 4 |

As discussed previously, some parameters of a component carrier, such as for example its bandwidth, may essentially exclude the use of some of the available PCFICH values for this component carrier, so that the possibility to signal (almost) all PCFICH values for each component carrier may not trade off the limitations implied for the scheduler. Hence, there may be some adequate mix of on the one hand limiting the scheduler flexibility in mapping DCI for cross-carrier scheduling to certain (anchor) component carriers and on the other hand the range of PCFICH values that can be signaled for the different component carriers.

For example, in one further embodiment, the user equipment could interpret a CIF field of a DCI signaled on component carrier A as shown in Table 4, Table 6 or Table 13 above, which would allow cross-scheduling of component carrier B on component carrier A, while the user equipment could interpret a CIF field of a DCI signaled on component carrier B as for example shown in Table 8.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for assigning downlink resources in a sub-frame of one of a plurality of downlink component carriers to a mobile terminal, the method comprising steps of:
    receiving downlink control information on the one of the plurality of the downlink component carriers, wherein a format of the downlink control information comprises
        a resource assignment field for indicating the assigned downlink resources within the sub-frame of the one of the plurality of the downlink component carriers, and
        a carrier indicator field for indicating the one of the plurality of the downlink component carriers with the assigned downlink resources, and for further indicating a number of Orthogonal Frequency Division Multiplexing ("OFDM") symbols used for control signaling within the sub-frame of the one of the plurality of the downlink component carriers with the downlink resources assigned by the downlink control information wherein a range of the number of the OFDM symbols used for the control signaling indicated by bits of the carrier indicator field covers only a selected subset of a total range of the number of the OFDM symbols configurable for the control signaling, the total range of the number of the OFDM symbols configurable for the control signaling being only a subset of a number of the OFDM symbols in the sub-frame;
    receiving downlink data on the assigned downlink resources,
    wherein the selected subset of the total range of the number of the OFDM symbols used for the control signaling indicated by the carrier indicator field depends on at least one of:
        a bandwidth of the indicated one of the plurality of the downlink component carriers with the assigned downlink resources,
        a type of the indicated one of the plurality of the downlink component carriers with the assigned downlink resources,
        the number of the OFDM symbols used for the control signaling on the one of the plurality of the downlink component carriers transmitting the downlink control information,
        a number of uplink ACK/NACKs to be signaled on the indicated one of the plurality of the downlink component carriers with the assigned downlink resources,
    and
    receiving at the mobile terminal a mapping selection message indicating a mapping of different mappings to be used for determining the number of the OFDM symbols used for the control signaling within the sub-frame of the one of the plurality of the downlink component carriers from the carrier indicator field of the downlink control information.

2. The method according to claim 1, wherein the carrier indicator field has a size of 3 bits.

3. The method according to claim 1, wherein the carrier indicator field of the downlink control information indicates at least two different subsets of codepoints representable by the bits of the carrier indicator field, wherein the respective codepoints of the at least two different subsets are mapped by the mobile terminal to different numbers of the OFDM symbols used for the control signaling within the sub-frame of the one of the plurality of the downlink component carriers with the downlink resources assigned by the downlink control information.

4. The method according to claim 3, wherein there is a plurality of different mappings pre-determined at the mobile terminal or configured by a higher layer signaling, wherein each of the plurality of the different mappings indicates a respective mapping of the codepoints of each of the at least two different subsets to a respective number of the OFDM symbols used for the control signaling within the sub-frame of the one of the plurality of the downlink component carriers with the downlink resources assigned by the downlink control information.

5. The method according to claim 4, wherein the plurality of the different mappings to be configured by the higher layer signaling is a subset of all possible mappings.

6. The method according to claim 4, further comprising steps of receiving at the mobile terminal a configuration message indicating the different mappings of respective values in each of the at least two different subsets to the respective number of the OFDM symbols used for the control signaling, and storing or updating the different mappings at the mobile terminal in response to the receiving of the configuration message.

7. The method according to claim 1, wherein the selected subset of the total range of the number of the OFDM symbols used for the control signaling indicated by the carrier indicator field depends on at least one of:
    interference conditions and power level on the indicated one of the plurality of the downlink component carriers with the assigned downlink resources,
    channel quality on the indicated one of the plurality of the downlink component carriers with the assigned downlink resources, and
    status of a load balancing function for the plurality of the downlink component carriers.

8. The method according to claim 1, wherein the mapping selection message is a Radio Resource Control (RRC) signaling message.

9. The method according to claim 1, further comprising a step of determining resource blocks assigned to the mobile terminal within the sub-frame of the one of the plurality of the downlink component carriers with the assigned downlink resources from the resource assignment field of the downlink control information and the number of the OFDM symbols used for the control signaling within the sub-frame of the one of the plurality of the downlink component carriers with the downlink resources assigned by the downlink control information,
    wherein the receiving of the downlink data on the assigned downlink resources comprises receiving modulation symbols on the determined resource blocks of the sub-frame.

10. The method according to claim 9, further comprising steps of:

demodulating the received modulation symbols to obtain encoded downlink data and decoding the encoded downlink data, wherein a modulation and coding scheme is indicated by the resource assignment field of the downlink control information.

11. The method according to claim 1, wherein the downlink control information is received on a first downlink component carrier of the plurality of the downlink component carriers and resources are assigned on a second downlink component carrier of the plurality of the downlink component carriers.

12. The method according to claim 1, wherein the indicated number of the OFDM symbols is a Physical Control Format Indicator Channel (PCFICH) value.

13. The method according to claim 1, wherein the control signaling is a Layer 1/Layer 2 (L1/L2) control signaling.

14. The method according to claim 1, wherein the downlink data are received using a retransmission protocol using soft-combining.

15. A mobile terminal for use in a mobile communication system using an aggregation of component carriers in downlink and capable of assigning downlink resources in a sub-frame of one of a plurality of downlink component carriers, the mobile terminal comprising:

a receiver for receiving downlink control information on the one of the plurality of the downlink component carriers, wherein a format of the downlink control information at least comprises a resource assignment field for indicating the assigned downlink resources within the sub-frame of the one of the plurality of the downlink component carriers, and a carrier indicator field for indicating the one of the plurality of the downlink component carriers with the assigned downlink resources, and for further indicating a number of Orthogonal Frequency Division Multiplexing ("OFDM") symbols used for control signaling within the sub-frame of the one of the plurality of the downlink component carriers with the downlink resources assigned by the downlink control information, wherein a range of the number of the OFDM symbols used for the control signaling indicated by bits of the carrier indicator field covers only a selected subset of a total range of the number of the OFDM symbols configurable for the control signaling, the total range of the number of the OFDM symbols configurable for the control signaling being only a subset of a number of the OFDM symbols in the sub-frame;

the receiver is adapted to receive downlink data on the assigned downlink resources, wherein the selected subset of the total range of the number of the OFDM symbols used for the control signaling indicated by the carrier indicator field depends on at least one of:

a bandwidth of the indicated one of the plurality of the downlink component carriers with the assigned downlink resources, a type of the indicated one of the plurality of the downlink component carriers with the assigned downlink resources, the number of the OFDM symbols used for the control signaling on the one of the plurality of the downlink component carriers transmitting the downlink control information, and a number of uplink ACK/NACKs to be signaled on the indicated one of the plurality of the downlink component carriers with the assigned downlink resources, and a processor for processing a received mapping selection message indicating a mapping of different mappings to be used for determining the number of the OFDM symbols used for the control signaling within the sub-frame of the one of the plurality of the downlink component carriers from the carrier indicator field of the downlink control information.

16. The mobile terminal according to claim 15, wherein the carrier indicator field of the downlink control information indicates at least two different subsets of codepoints representable by the bits of the carrier indicator field, wherein the processor maps the respective codepoints of the at least two different subsets to different numbers of the OFDM symbols used for the control signaling within the sub-frame of the one of the plurality of the downlink component carriers with the downlink resources assigned by the downlink control information using one of a plurality of different mappings, wherein the receiver is further adapted to receive a higher layer signaling configuring the plurality of the different mappings, wherein each of the plurality of the different mappings indicates a respective mapping of the codepoints of each of the at least two different subsets to the respective number of the OFDM symbols used for the control signaling within the sub-frame of the one of the plurality of the downlink component carriers with the downlink resources assigned by the downlink control information.

17. The processor according to claim 16, further determining resource blocks assigned to the mobile terminal within the sub-frame of the one of the plurality of the downlink component carriers from the resource assignment field of the downlink control information and the number of the OFDM symbols used for the control signaling within the sub-frame of the one of the plurality of the downlink component carriers with the downlink resources assigned by the downlink control information, wherein the receiver is adapted to receive the downlink data on the assigned downlink resources and to receive modulation symbols on the determined resource blocks of the sub-frame.

18. The mobile terminal according to claim 17, further comprising:

a demodulator for demodulating the received modulation symbols to obtain encoded downlink data and a decoder for decoding the encoded downlink data, wherein a modulation and coding scheme is indicated by the resource assignment field of the downlink control information.

19. The mobile terminal according to claim 15, wherein the carrier indicator field of the downlink control information indicates at least two different subsets of codepoints representable by the bits of the carrier indicator field, wherein the processor maps the respective codepoints of the at least two different subsets to different numbers of the OFDM symbols used for the control signaling within the sub-frame of the one of the plurality of the downlink component carriers with the downlink resources assigned by the downlink control information using one mapping out of a subset of a plurality of pre-determined different mappings, wherein the receiver is adapted to receive a higher layer control signaling configuring the subset of the plurality of different mappings to be used by the mobile terminal.

20. A non-transitory computer readable medium storing instructions that, when executed by a processor of a mobile terminal, cause the mobile terminal to:

receive downlink control information on one of a plurality of downlink component carriers, wherein a format of the downlink control information comprises
- a resource assignment field for indicating assigned downlink resources within a sub-frame of the one of the plurality of the downlink component carriers, and
- a carrier indicator field for indicating the one of the plurality of the downlink component carriers with the assigned downlink resources, and for further indicating a number of Orthogonal Frequency Division Multiplexing ("OFDM") symbols used for control signaling within the sub-frame of the one of the plurality of the downlink component carriers with the downlink resources assigned by the downlink control information, wherein a range of the number of the OFDM symbols used for the control signaling indicated by bits of the carrier indicator field covers only a selected subset of a total range of the number of the OFDM symbols configurable for the control signaling, the total range of the number of the OFDM symbols configurable for the control signaling being only a subset of a number of the OFDM symbols in the sub-frame;

receive downlink data on the assigned downlink resources, wherein the selected subset of the total range of the number of the OFDM symbols used for the control signaling indicated by the carrier indicator field depends on at least one of:
- a bandwidth of the indicated one of the plurality of the downlink component carriers with the assigned downlink resources,
- a type of the indicated one of the plurality of the downlink component carriers with the assigned downlink resources,
- the number of the OFDM symbols used for the control signaling on the one of the plurality of the downlink component carriers transmitting the downlink control information,
- a number of uplink ACK/NACKs to be signaled on the indicated one of the plurality of the downlink component carriers with the assigned downlink resources, and receive a mapping selection message indicating a mapping of different mappings to be used for determining the number of the OFDM symbols used for the control signaling within the sub-frame of the one of the plurality of the downlink component carriers from the carrier indicator field of the downlink control information.

* * * * *